United States Patent
Hiraki

(10) Patent No.: US 6,976,337 B2
(45) Date of Patent: Dec. 20, 2005

(54) ENERGY-SAVING HOUSING

(75) Inventor: Koji Hiraki, Nogata (JP)

(73) Assignees: Nogatakenzai Co., Ltd., Nogata (JP); House Port 23 Co., Ltd., Nogata (JP)

(*) Notice: Subject to any disclaimer, the term of this patent is extended or adjusted under 35 U.S.C. 154(b) by 152 days.

(21) Appl. No.: 09/989,073

(22) Filed: Nov. 21, 2001

(65) Prior Publication Data
US 2002/0088184 A1 Jul. 11, 2002

(30) Foreign Application Priority Data
Nov. 24, 2000 (JP) ............................. 2000-357888

(51) Int. Cl.[7] ............................................... E04H 1/00
(52) U.S. Cl. .................... 52/79.1; 52/90; 52/169.5; 52/199; 52/236.3; 52/236.6; 52/267; 52/269; 52/294; 52/309.8; 52/309.9; 52/329; 52/340; 52/407.1; 52/408; 52/404.1; 52/783.1; 52/794.1
(58) Field of Search ............................. 52/79.1, 169.5, 52/90, 404.1, 408, 236.3, DIG. 17, 267, 268, 52/269, 294, 309.8, 309.9, 407.1, 236.6, 52/794.1, 783.1, 199, 319, 340

(56) References Cited

U.S. PATENT DOCUMENTS

| | | | | |
|---|---|---|---|---|
| 1,086,031 A | * | 2/1914 | Davis | 52/216 |
| 1,698,763 A | * | 1/1929 | McCauley | 454/232 |
| 2,204,583 A | * | 6/1940 | Falls | 52/302.3 |
| 2,559,869 A | * | 7/1951 | Gay | 237/50 |
| 2,598,842 A | * | 6/1952 | Scott | 237/69 |
| 2,649,726 A | * | 8/1953 | Wyman | 454/185 |
| 2,811,850 A | * | 11/1957 | Clary | 52/284 |
| 3,500,596 A | * | 3/1970 | Andersson | 52/79.7 |
| 3,526,361 A | * | 9/1970 | Piper | 237/8 R |
| 3,576,157 A | * | 4/1971 | Sebald | 454/185 |
| 3,866,672 A | * | 2/1975 | Rich et al. | 165/50 |
| 3,929,186 A | * | 12/1975 | Becker | 165/49 |
| 4,052,829 A | * | 10/1977 | Chapman | 52/281 |
| 4,089,142 A | * | 5/1978 | Kachadorian | 237/1 R |
| 4,103,598 A | * | 8/1978 | Cooper | 454/186 |
| 4,127,973 A | * | 12/1978 | Kachadorian | 52/169.11 |
| 4,182,085 A | * | 1/1980 | Elson | 52/2 |
| 4,295,415 A | * | 10/1981 | Schneider, Jr. | 454/185 |
| 4,296,798 A | * | 10/1981 | Schramm | 165/56 |
| 4,301,859 A | * | 11/1981 | Hollemann | 165/49 |

(Continued)

FOREIGN PATENT DOCUMENTS

JP 60-99415 7/1985

(Continued)

Primary Examiner—Carl D. Friedman
Assistant Examiner—Christy M Green
(74) Attorney, Agent, or Firm—Oblon, Spivak, McClelland, Maier & Neustadt, P.C.

(57) ABSTRACT

The invention provides energy-saving housing wherein the indoor temperature condition can be made comfortable throughout the year by a small amount of energy by suppressing loads on cooling and heating devices, and high airtightness and high heat insulation performance can be maintained for a long period of time so that durability is excellent. The energy-saving housing includes wall parts provided with inner walling made from an inorganic material and heat insulators made from an organic foamed material, a ceiling part provided with inner walling made from an inorganic material, heat insulators made from an organic foamed material at the ceiling part or roof part, and a floor heating device provided at least at the floor part of the lower floor, and has an equivalent clearance area of from 0.3 $cm^2/m^2$ to 0.6 $cm^2/m^2$.

11 Claims, 10 Drawing Sheets

U.S. PATENT DOCUMENTS

| | | | | |
|---|---|---|---|---|
| 4,435,928 A | * | 3/1984 | Huling | 52/90 |
| 4,492,727 A | * | 1/1985 | Inui | 428/32.64 |
| 4,523,519 A | * | 6/1985 | Johnson | 454/185 |
| 4,576,333 A | * | 3/1986 | Piper | 237/49 |
| 4,580,487 A | * | 4/1986 | Sosnowski | 454/186 |
| 4,628,650 A | * | 12/1986 | Parker | 52/265 |
| 4,741,391 A | * | 5/1988 | Schmitz | 165/56 |
| 4,848,050 A | * | 7/1989 | Tanaka | 52/169.1 |
| 4,852,310 A | * | 8/1989 | Henley | 52/90 |
| 4,852,316 A | * | 8/1989 | Webb | 52/235 |
| 5,010,116 A | * | 4/1991 | Colafati | 521/155 |
| 5,028,487 A | * | 7/1991 | Kindt et al. | 428/489 |
| 5,337,533 A | * | 8/1994 | Kajita | 52/741.1 |
| 5,349,749 A | * | 9/1994 | Fiedler | 29/897 |
| 5,375,631 A | * | 12/1994 | Mochizuki | 141/7 |
| 5,669,232 A | * | 9/1997 | Iwamoto et al. | 62/296 |
| 5,678,384 A | * | 10/1997 | Maze | 52/783.17 |
| 5,902,183 A | * | 5/1999 | D'Souza | 454/258 |
| 5,993,720 A | * | 11/1999 | Konuma et al. | 264/263 |
| 6,247,747 B1 | * | 6/2001 | Kawanomoto et al. | 296/191 |
| 6,324,812 B1 | * | 12/2001 | Drya-Lisiecka | 52/783.11 |
| 6,418,687 B1 | * | 7/2002 | Cox | 52/309.4 |
| 6,621,983 B2 | * | 9/2003 | Thorin | 392/435 |
| 6,630,414 B1 | * | 10/2003 | Matsumoto | 442/1 |
| 6,650,425 B2 | * | 11/2003 | Kubota et al. | 356/614 |

FOREIGN PATENT DOCUMENTS

| | | |
|---|---|---|
| JP | 8-135035 | 5/1996 |
| JP | 10-205015 | 8/1998 |
| JP | 11-62409 | 3/1999 |
| JP | 11-200646 | 7/1999 |
| JP | 11-247320 | 9/1999 |
| JP | 2000-248646 | 9/2000 |
| JP | 2000-273976 | 10/2000 |

* cited by examiner

Fig. 9
(a)
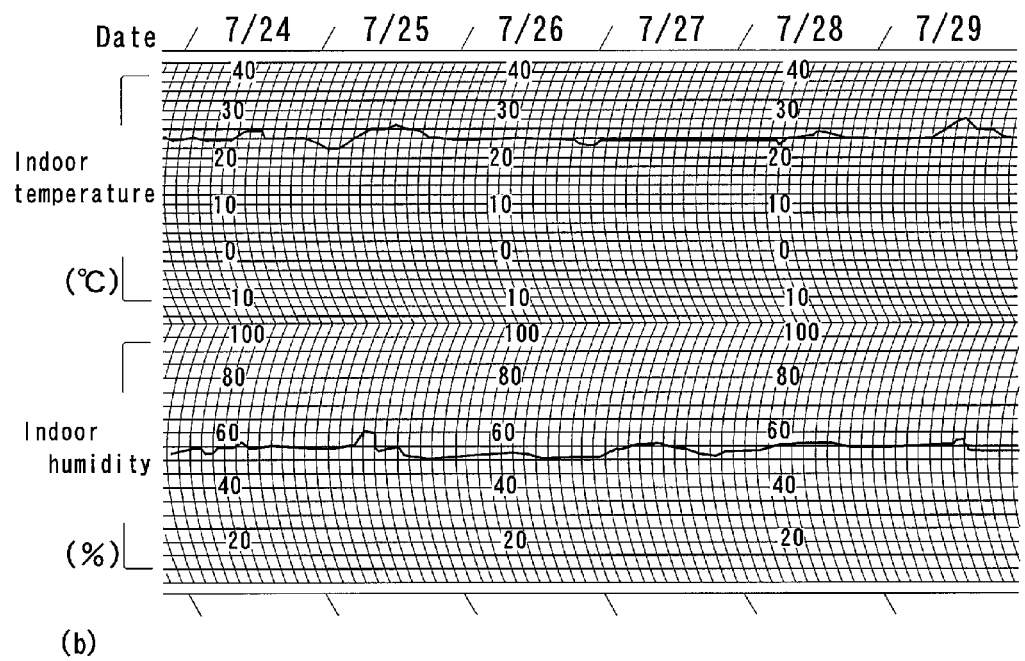
(b)
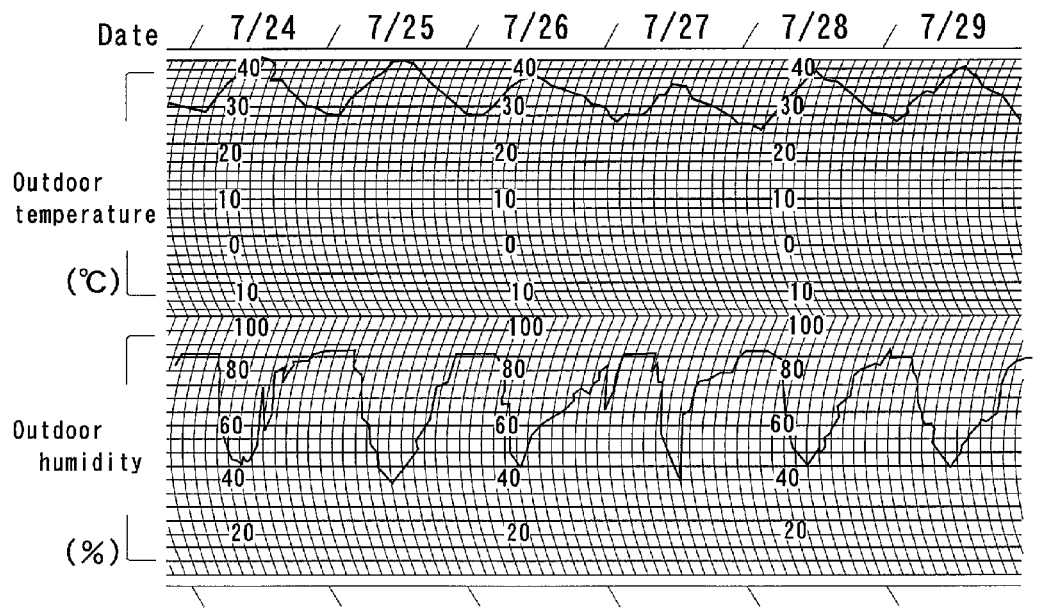

ENERGY-SAVING HOUSING

BACKGROUND OF THE INVENTION

1. Field of the Invention

The present invention relates to energy-saving housing including residential housing or various facilities including gymnasiums, hospitals, convenience stores, and the like, which are high in airtightness and heat insulation, and can suppress loads on air conditioners, realize comfortable indoor temperatures and humidity conditions, and realize healthy living and working spaces.

2. Description of the Related Art

In conventional housing, air conditioning is carried out for each room by heating systems and cooling systems installed in each room. Therefore, such housing requires costs for heating and cooling each room, and imposes a burden on human bodies due to increased differences in temperature between rooms with air-conditioning and rooms without air-conditioning.

Therefore, recently, housing with a floor heating device for heating the whole housing to reduce the differences in temperature between rooms has spread, Furthermore, in order to increase efficiency of the floor heating and cooling systems and achieve energy-savings, energy-saving housing has also spread which is high in airtightness and heat insulation, and has a programmed ventilation system, which has detailed programs for an air inlet and an air outlet and forcibly exchanges indoor air with fresh air.

As recent energy-saving housing, "energy-saving health-improving housing, wherein an energy-saving health-improving layer, which is comprised of a heat insulating layer, airtight dampproofing layer, and charcoal layer, and has both energy-saving performance and health-improving performance, is provided inside the structures of the walls, ceilings, and floors of the rooms facing the outside air in a wooden house, an air ventilation system to which an indoor air circulation type heat exchanger and a health-improving duct with a charcoal layer are attached are mounted as an air conditioning system, and a wood-framed triple glass sash is attached to a fixture facing the outside air", has been disclosed in Japanese Unexamined Patent Publication No. 1999-200646 (hereinafter, referred to as Art A), and in addition, "energy-saving housing which is comprised of walls, floors, and ceilings using 200 mm glass wool, and provided with a heat exchanging type mechanical ventilation for ventilating air in the housing" (hereinafter, referred to as Art B) or the like has been disclosed.

However, conventional energy-saving housing has the following problems.

In Arts A and B, since glass wool is used for heat insulators for walls or the like, the gap between the inner wall and outer wall cannot be completely filled with the heat insulator made from glass wool, so that a gap remains, and since there is a phenomenon in that the heat insulator made from glass wool sags, the gap increases with the elapse of time and the heat insulating effect cannot be maintained for a long period of time. Furthermore, the heat insulator made from glass wool is insufficient in the heat insulating effect as a heat insulator since air moves inside the heat insulator. Therefore, even if floor heating devices are installed in the energy-saving health-improving housing of Art A and the energy-saving housing of Art B, heat leaks from walls, gaps, and openings, so that efficient indoor heating cannot be obtained, and in particular, in the case where the housing is multistoried, heating systems are required for each floor in the present arts.

SUMMARY OF THE INVENTION

The present invention solves the abovementioned problems of the prior art, and the object thereof is to provide energy-saving housing, wherein comfortable temperatures and humidity conditions can be maintained throughout year with little energy while suppressing loads on cooling and heating devices, healthy living and working spaces can be realized, high airtightness and high heat insulation performance can be maintained for a long period of time, and the durability thereof is excellent.

In order to solve the abovementioned problems in the prior arts, the energy-saving housing of the invention is constructed as follows.

Energy-saving housing according to a first aspect of the invention is comprised of wall parts including inner walling made from an organic foamed material and a heat insulator made from an organic foamed material, ceiling parts including inner walling made from an inorganic material, a heat insulator made from an organic foamed material provided at the ceiling parts or roof part, and a floor heating device provided at least at the floor part of the lower floor, wherein an equivalent clearance area is 0.1 $cm^2/m^2$ through 0.95 $cm^2/m^2$, preferably, 0.3 $cm^2/m^2$ through 0.6 $cm^2/m^2$.

Thereby, the following actions are obtained.

(1) Since a floor heating device is provided at the floor part and inner walling made from an inorganic material is provided for the wall parts and ceiling parts, far infrared rays generated from the floor part by the floor heating device are caused to act on molecular motion in crystal water and condensed water of the inner walling made from an inorganic material, whereby radiant heat can be obtained from the inner walling, the inside of the housing can be heated by both heat directly obtained from the floor heating device and radiant heat from the inner walling, loads on the floor heating device can be suppressed, and the indoor heating effect by the floor heating device can be increased.

(2) Since an inorganic material with low heat conductivity is used for the inner walling of the wall parts and ceiling parts, heat can be accumulated at the wall parts and ceiling parts by far infrared rays obtained from the floor heating device, and therefore, heat-retention inside the housing is excellent.

(3) Since an inorganic material with a porous surface is used for the inner walling of the wall parts and ceiling parts, in accordance with differences in humidity between the outside air and indoor air, water vapor in the air inside the inner walling can be condensed and the condensed moisture inside the inner walling can be discharged to the air inside the housing as water vapor, whereby the indoor humidity can be automatically adjusted.

(4) Since heat insulators made from an organic foamed material are provided at the wall parts and the ceiling parts or roof part, so that the heat quantity that leaks from the wall parts, ceiling parts or roof part toward the outside can be suppressed, whereby heat insulation can be improved and the indoor temperature can be strictly prevented from changing due to influences from the outside air temperature.

(5) The housing is formed so that the equivalent clearance area is 0.1 $cm^2/m^2$ through 0.95 $cm^2/m^2$ preferably, 0.3 $cm^2/m^2$ through 0.6 $cm^2/m^2$, and heat insulators made from an organic foamed material are provided at the wall parts and the ceiling parts or roof part, so that flowing-in of the outside air into the inside of the housing and flowing-out of the inside air can be greatly suppressed, whereby a heat loss amount can be greatly suppressed, indoor cooling and heating effects can be increased, and energy for the cooling and heating devices can be saved.

(6) Since a floor heating device is provided at the floor part, different from the prior arts in which various heating devices are provided for each room and heating is carried out for each room, the whole housing can be heated by radiant heat obtained by the floor heating device at the floor part.

Herein, as the inner walling made from an inorganic material, members with low heat conductivity, heat accumulation performance, incombustibility, such as plaster boards or concrete boards are preferably used.

When a wellhole part is not provided between the lower floor and the upper floor of the energy-saving housing such as in the case of entire two-storied housing, floor heating devices may be formed at the floor parts of both lower and upper floors. Thereby, both lower and upper floors can be heated by the respective floor heating devices. In a case where a wellhole part is provided between the lower and upper floors, radiant heat generated by a floor heating device provided at the floor part of the lower floor passes through the wellhole part and heats the upper floor as well, so that a floor heating device may not be provided at the floor part of the upper floor.

As the equivalent clearance area becomes smaller than 0.3 $cm^2/m^2$, the number of construction processes increases, costs tend to be excessively high, and if the area becomes smaller than 0.1 $cm^2/m^2$, this tendency becomes conspicuous. On the other hand, as the equivalent clearance area becomes larger than 0.6 $cm^2/m^2$, the housing's airtightness lowers and the heat loss amount increases, so that the cooling and heating effects by the floor heating device and cooling device lower, it becomes difficult to carry out programmed ventilation, energy-savings become difficult, and if the area becomes larger than 0.95 $cm^2/m^2$, this tendency becomes conspicuous.

In energy-saving housing according to a second aspect of the invention, the heat transmission coefficient of the ceiling parts or roof part and the wall parts is 0.1 $W/m^2K$ through 0.7 $W/m^2K$, preferably, 0.15 $W/m^2K$ through 0.35 $W/m^2K$ in the first aspect of the invention.

Thereby, in addition to actions of the first aspect, the following actions can be obtained.

(1) Since the heat transmission coefficient of the ceiling parts or roof part and the wall parts is 0.1 $W/m^2K$ through 0.7 $W/m^2K$, preferably, 0.15 $W/m^2K$ through 0.35 $W/m^2K$, the heat loss amount from the ceiling parts or roof part and the wall parts can be suppressed and the indoor airtightness and heat insulation can be increased, and as a result, cooled or heated indoor air can be greatly suppressed from leaking from the ceiling parts or roof part and the wall parts. Therefore, cooling and heating effects of the cooling and heating devices inside the housing can be increased and energy for the cooling and heating devices can be saved. Furthermore, due to the low heat transmission coefficient, influences from the outside air temperature an the indoor temperature can be suppressed.

Herein, as the heat transmission coefficient becomes smaller than 0.15 $W/m^2K$, the thicknesses of the ceiling parts or roof part and the wall parts tend to increase and construction of the ceiling parts or roof part and the wall parts tend to become difficult. When the coefficient becomes smaller than 0.1 $W/m^2K$, this tendency becomes conspicuous, and on the other hand, as the heat transmission coefficient becomes higher than 0.35 $W/m^2K$, the heat loss amount from the ceiling parts or roof part and the wall parts increases, and the airtightness and heat insulation of the energy-saving housing lower, so that the cooling and heating effects by the floor heating device and cooling device lower, it becomes impossible to achieve energy-savings, and when the coefficient becomes higher than 0.7 $W/m^2K$, this tendency becomes conspicuous.

The ceiling part or roof part is formed so as to have a heat transmission coefficient that is lower than that of the wall parts. This is because burdens due to sunlight and outside temperatures are imposed on the attic space of the ceiling parts or roof part.

Energy-saving housing according to a third aspect of the invention further comprises a programmed ventilator for forcibly ventilating the whole indoor air in the first or second aspect of the invention.

Thereby, the following actions are obtained in addition to the actions of the first or second aspect.

(1) Since the programmed ventilator is provided, even in the case where the inside of the housing is made high in airtightness so as to have an equivalent clearance area of 0.3 $cm^2/m^2$ through 0.6 $cm^2/m^2$, the humidity of the inside of the housing can be maintained within an optimum humidity range of 40% through 60% throughout the year, infestation of ticks, growth of molds, and indoor condensation can be prevented, whereby comfortable living and working spaces can be realized.

(2) Since the whole indoor air can be forcibly ventilated by the programmed ventilator, the air inside housing with high airtightness can be always exchanged with fresh air, whereby the indoor environment can be improved.

Herein, as the programmed ventilator, any type may be used if it comprises air inlets disposed at predetermined positions inside the housing, suction ports disposed in each room, a ventilation duct communicated with the suction ports, a ventilation fan communicated with the ventilation duct, an air outlet communicated with the ventilation fan and outside air, and can always maintain fresh indoor air by exchanging the indoor air with outside air. Or, a programmed ventilator with a heat exchanger or air cleaner or a programmed ventilator with an air cleaning filter attached to the air inlet may be used. Particularly, in the case of a ventilator with a heat exchanger, an increase and a decrease in temperature of the inside can be prevented and a comfortable air temperature can be always maintained by ventilation. Meanwhile, in the case of a ventilator with an air cleaning filter or air cleaner, entrance of pollen, viruses, insects, dust, and bad odors such as exhaust gases into the inside of the housing can be prevented, and indoor odors caused by smoking or cooking and moisture generated from human breaths or generated in a bathroom can be eliminated, whereby the indoor air can be maintained to be clean.

Energy-saving housing according to a fourth aspect of the invention further comprises a wellhole part with a wellhole opening proportion of 15% through 50%, preferably 20% through 50% of the floor area of the lower floor in any one of the first through third aspects of the invention.

Thereby, in addition to the actions of the first through third aspects of the invention, the following actions are obtained.

(1) Radiant heat from the floor heating device provided at the floor part of the lower floor can be transmitted to the upper floor through the wellhole part, and without providing a floor heating device and various heating devices for the upper floor, both lower and upper floors can be heated by only the floor heating device provided at the floor part of the lower floor, whereby energy-saving can be achieved.

(2) The wall parts and ceiling parts or roof part of the energy-saving housing have the construction according to the first aspect of the invention, and a floor heating device is provided at the floor part of the lower floor, so that a wellhole part with an opening proportion of 15% through 50%, preferably 20% through 50% of the floor area of the lower floor can be formed.

Herein, the opening proportion of the wellhole part of the invention does not include the opening proportion of the stairs part. This is because the necessity for floor heating under the stairs is low because of low floor heating efficiency under the stairs.

As the opening proportion of the wellhole part becomes smaller than 20% of the floor area of the lower floor, transmission of radiant heat from the floor heating device to the upper floor becomes difficult, and the heating effect of the upper floor becomes lower. As the opening proportion becomes higher than 50% of the floor area of the lower floor, the floor area of the upper floor becomes excessively narrow, and the living floor area becomes narrow. This is not economical and insufficient in practicability of the upper floor.

In addition, the radiant heat from the floor heating device is transmitted to the upper floor's ceiling part through the wellhole part, so that inner walling formed of an inorganic plate may be provided at only a portion of the ceiling part of the upper floor corresponding to the upper part of the wellhole part (a part to which the radiant heat from the floor heating device directly strikes).

Energy-saving housing according to a fifth aspect of the invention further comprises openings with a heat transmission coefficient of 1.4 W/m$^2$K through 2.5 W/m$^2$K in any one of the first through fourth aspects.

Thereby, in addition to the actions of the first through fourth aspects, the following actions are obtained. (1) Since the heat transmission coefficient of the opening is 1.4 W/m$^2$K through 2.5 W/m$^2$K, the heat loss amount of the heat leaking from the openings of the window parts and the door parts at the entrance to the outside can be suppressed, high airtightness and high heat insulation of the energy-saving housing can be maintained, and loads on the floor heating device and cooling device of the energy-saving housing can be suppressed, whereby the indoor heating efficiency and cooling efficiency can be increased by a small quantity of energy.

Herein, the openings mean the communicating portions between the window parts, entrance and kitchen door, and the outside.

As glass to be used for the openings such as window parts, a high heat insulating multi-laminated glass, a metal film-coated (LOW-E) heat insulating multi-laminated glass, a multi-laminated glass such as a paired strengthened glass which is coated with a metal film-coated (LOW-E) and sealed with inert gases such as an argon gas, or a single plate glass doubly or triply provided can be used.

As the heat transmission coefficient of the openings becomes smaller than 1.4 W/m$^2$K, the window parts and door parts at the entrance and the like become heavier and difficult to open and close, and practicability is insufficient, and on the other hand, as the heat transmission coefficient of the openings becomes higher than 2.5 W/m$^2$K, indoor heat leaks from the openings to the outside and outside heat flows in the inside to increase the heat loss amount from the openings, and the airtightness and heat insulation of the energy-saving housing deteriorate, and therefore, condensation cannot be prevented, the cooling and heating effects by the floor heating device and cooling device lower, and it becomes impossible to achieve energy-savings.

Energy-saving housing according to a sixth aspect of the invention is constructed so that the heat insulator at the wall parts and the heat insulator at the ceiling parts or roof part are formed of soft foamed urethane that is sprayed on structural boards of the outer wall sides of the wall parts and structural boards of the ceiling parts or roof part in any one of the first through fifth aspects of the invention.

Thereby, in addition to the actions of the first through fifth aspects of the invention, the following actions are obtained.

(1) The heat insulators of the wall parts and the ceiling parts or roof part are formed from soft foamed urethane, and the urethane is sprayed on structural boards of the outer wall sides of the wall parts and structural boards of the ceiling parts or roof part, so that the soft foamed urethane can be closely adhered to any gaps, deterioration of the soft foamed urethane such as separation from the structural boards with the elapse of time is prevented, whereby a high heat insulating effect can be maintained for a long period of time.

(2) Since the soft foamed urethane is sprayed on the structural boards, heat insulators with airtightness can be formed by spraying at the housing construction site, and this improves housing construction work efficiency.

(3) Since the heat insulators are made from soft foamed urethane, the heat insulators can be adapted to shrinkage or the like due to dry of the structural members and shocks of earthquakes, whereby cracks of the heat insulators and separation of the heat insulators from the structural boards and members can be prevented and the heat insulators become excellent in durability.

Herein, as the soft foamed urethane, a polyethylene foam, crosslinked polyethylene foam, polypropylene foam, urea resin foam such as ICYNENE FOAM (Product Name, made by ICYNENE INC.) or SELECTION 500 (Commercial Name) is used. Thereby, by an easy process of spraying soft foamed urethane on structural boards, heat insulators for the wall parts and the ceiling parts or roof part can be formed, and the heat transmission coefficient of the ceiling parts or roof part and the wall parts can be made to 0.15 W/m$^2$K through 0.35 W/m$^2$K, whereby construction work efficiency for energy-saving housing with high airtightness and heat insulation can be improved. The ICYNENE FOAM is excellent in flexibility since its foams are continuous, excellent in durability without deterioration due to ultraviolet rays and moisture, and excellent in safety due to its noncombustibility, and therefore, the ICYNENE FOAM is preferably used.

It is preferable that the surfaces of structural boards (structural panels) on which the soft foamed urethane is sprayed is not smoothed, but is left rough. Thereby, when spraying the soft foamed urethane onto the structural boards, due to the anchoring effect of unevenness at the surfaces of the structural boards, the adhesive strength of the soft foamed urethane to the structural boards can be increased.

Energy-saving housing according to a seventh aspect of the invention is constructed so that the floor heating device comprises a heat accumulating layer formed at the lower part of the floor part and hot water pipes buried in the heat accumulating layer, and a reinforcing mesh which is formed into an equal-spaced grid and laid below the hot water pipes in any one of the first through sixth aspects of the invention.

Thereby, in addition to the actions of the first through sixth aspects, the following actions are obtained.

(1) Since a reinforcing mesh is laid below the hot water pipes, by only tying the hot water pipes to the reinforcing mesh based on the grid of the reinforcing mesh when installing the floor heating device, the hot water pipes can be easily piped at equal pitches and piping work efficiency for the hot water pipes can be improved. In addition, since the hot water pipes are piped above the reinforcing mesh, after piping the hot water pipes, walking on the reinforcing mesh becomes possible without stepping on the hot water pipes, whereby construction work efficiency fort the floor heating device can be improved.

(2) Since the hot water pipes can be piped based on the grid of the grid-shaped reinforcing mesh, marking when piping the hot water pipes becomes unnecessary and piping work efficiency is improved, and in addition, the hot water pipes can be easily piped excluding the portion such as a sink which does not require floor heating, whereby the hot water pipes can be piped at necessary portions without waste.

Herein, the grid of the reinforcing mesh is determined in accordance with the piping pitches of the hot water pipes, and is generally determined to have 100 mm through 420 mm, preferably 100 mm through 150 mm pitches. Thereby, the hot water pipes can be laid in accordance with the grid of the reinforcing mesh, whereby piping work efficiency for the hot water pipes can be improved.

If the grip pitches of the reinforcing mesh become smaller than 100 mm, it becomes difficult to bend the hot water pipes in accordance with the grid of the reinforcing mesh and pipe the hot water pipes in accordance with the reinforcing mesh, and therefore, it becomes impossible to improve piping work efficiency for the hot water pipes. On the other hand, as the pitches become larger than 150 mm, the pitches of piping of the hot water pipes become larger, so that it becomes impossible to closely lay the hot water pipes. Particularly, if the pitches become larger than 420 mm, this tendency becomes conspicuous, and floor heating by the floor heating device tends to be uneven.

BRIEF DESCRIPTION OF THE DRAWINGS

FIG. 8($b$) is a chart of changes in the outdoor temperature and humidity in winter;

FIG. 9($a$) is a chart of changes in the indoor temperature and humidity of the energy-saving housing 1 in summer;

FIG. 9($b$) is a chart of changes in the outdoor temperature and humidity in summer.

DETAILED DESCRIPTION OF THE PREFERRED EMBODIMENT (Embodiment)

The energy-saving housing of the invention is explained hereinafter by using an example of two-storied energy-saving housing having a wellhole part with reference to the drawings.

Figure 1:
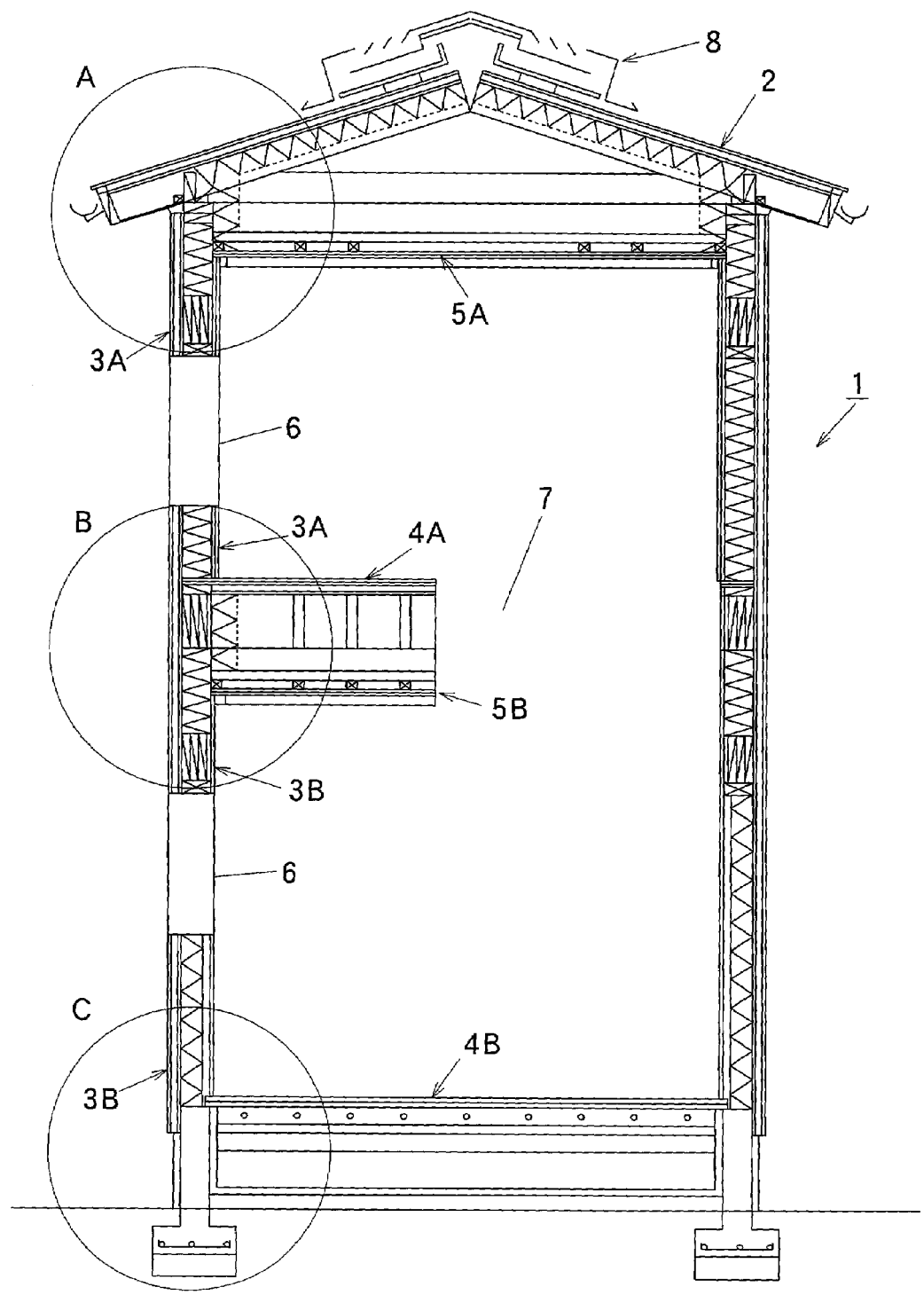
FIG. 1 is a principal partially sectional view of a two-storied energy-saving housing according toa first embodiment of the invention.
Figure 2:
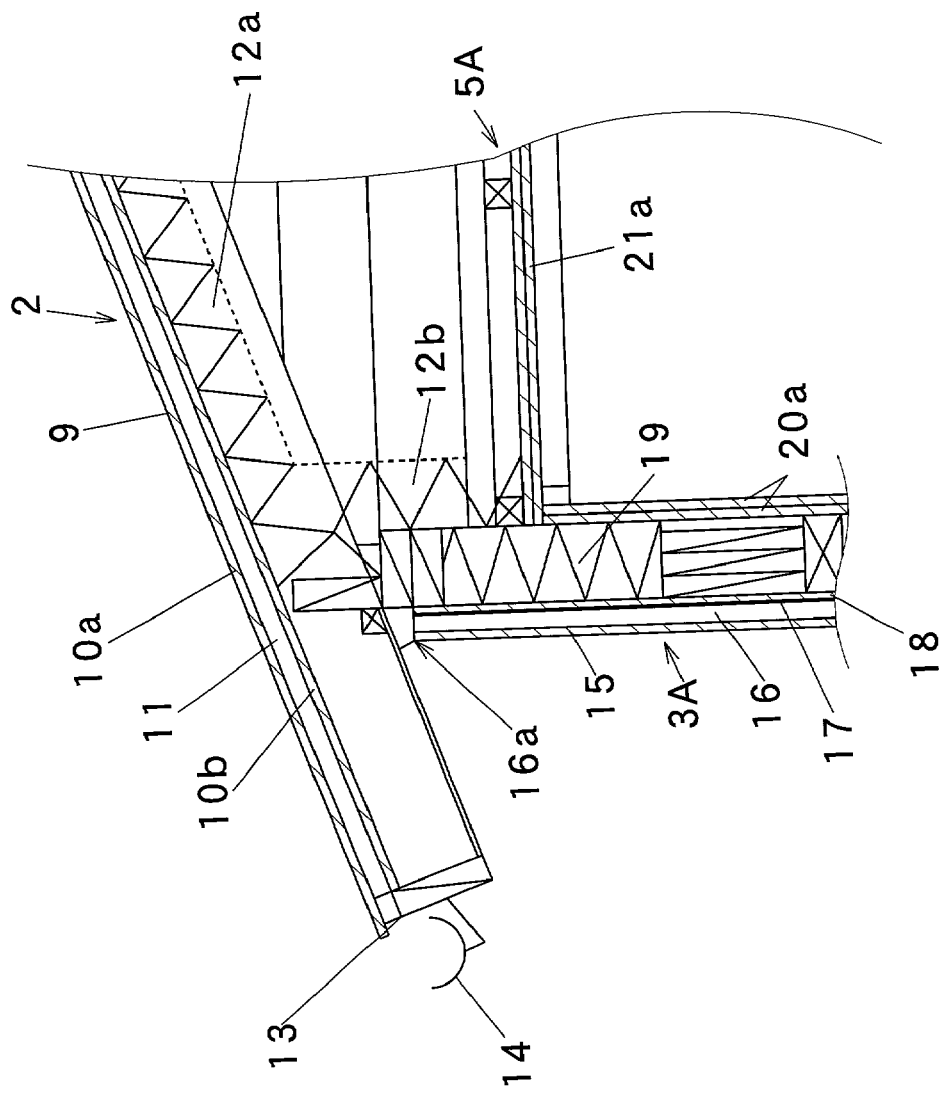
FIG. 2 is an enlarged view of the section A of FIG. 1.
Figure 3:
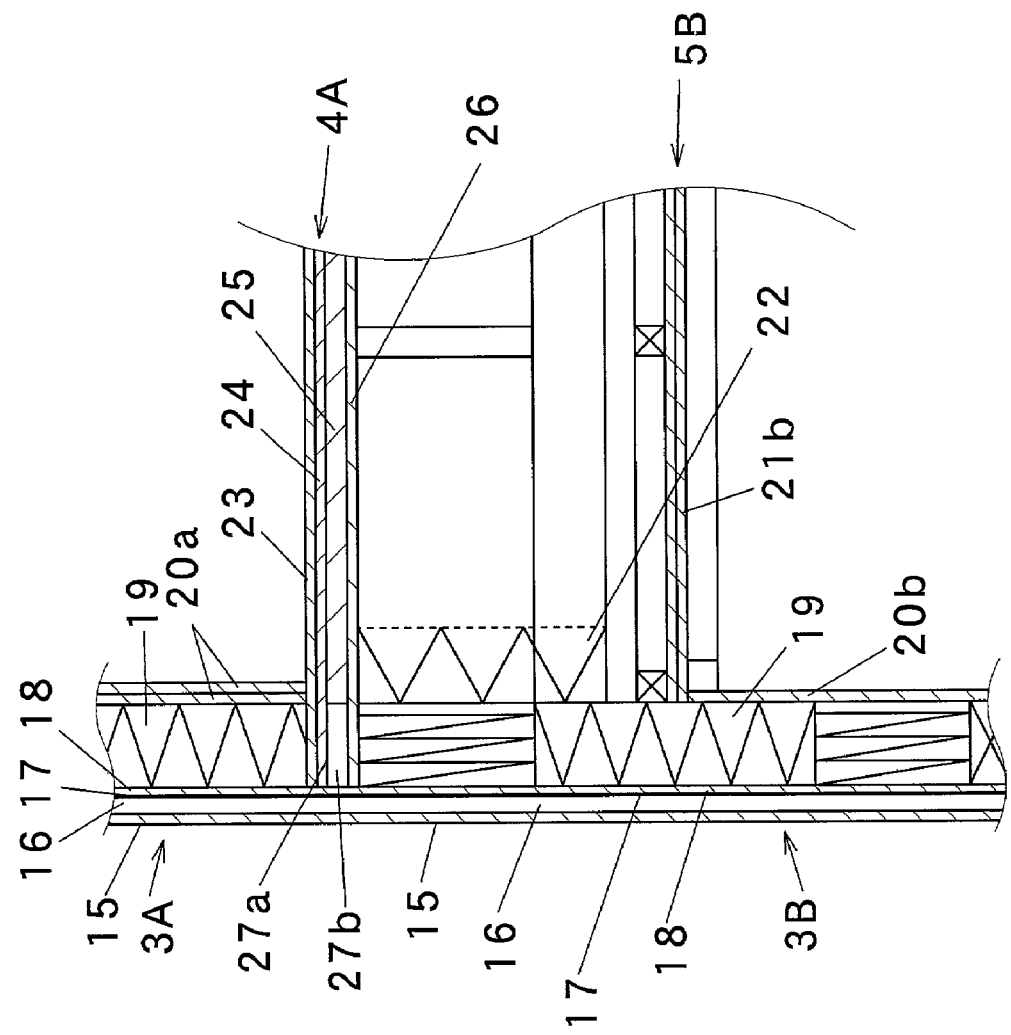
FIG. 3 is an enlarged view of the section B of FIG. 1.
Figure 4:
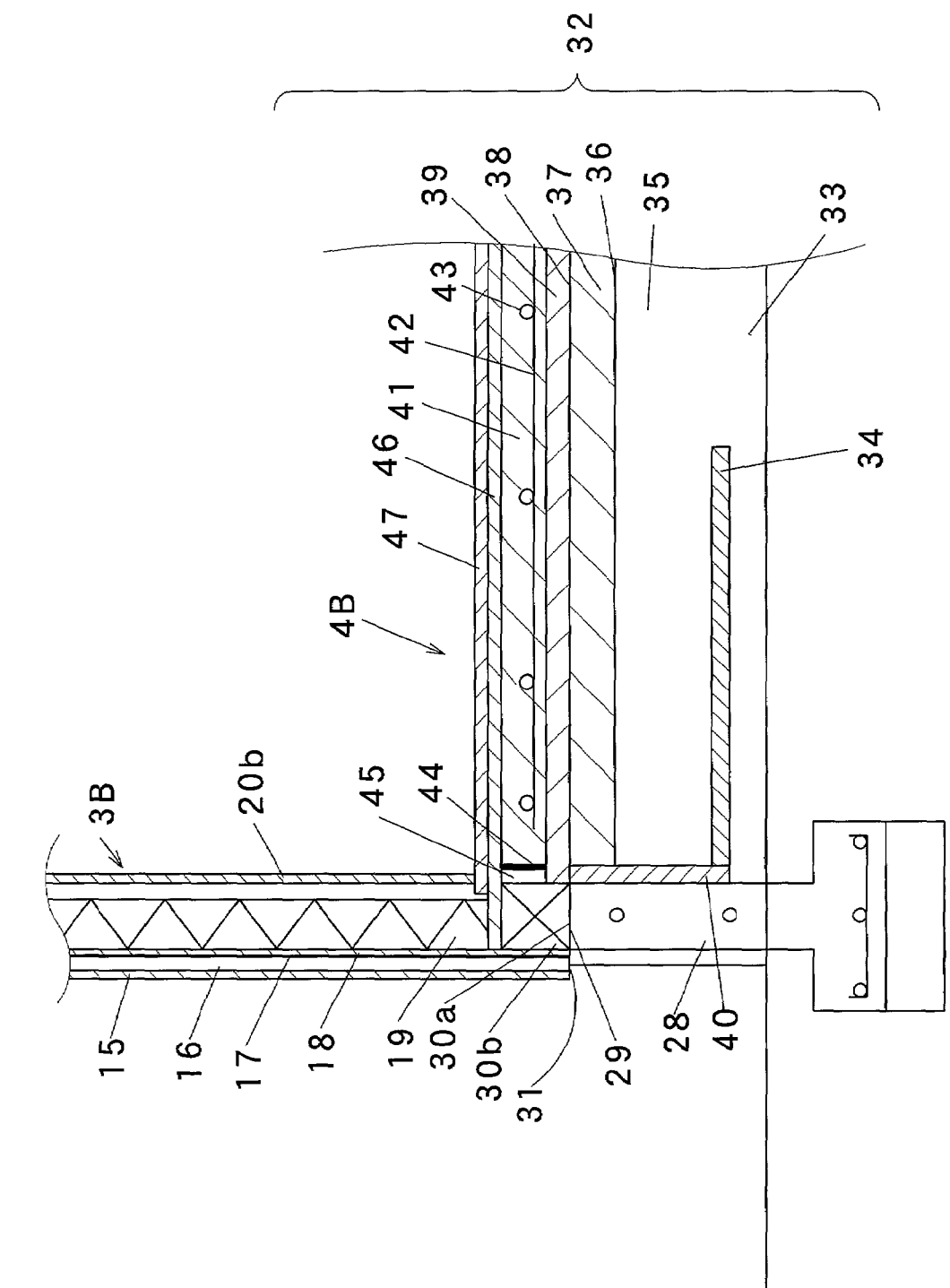
FIG. 4 is an enlarged view of the section C of FIG. 1.

FIG. 1 is a principal partially sectional view of the two-storied energy-saving housing of the embodiment, FIG. 2 is an enlarged view of the section A of FIG. 1, FIG. 3 is an enlarged view of the section B of FIG. 1, and FIG. 4 is an enlarged view of the section C of FIG. 1.

In FIG. 1, the numerical reference 1 denotes the two-storied energy-saving housing of this embodiment of the invention. Reference number 2 denotes the roof part of the energy-saving housing 1. Reference number 3A denotes the wall part of the second floor of the energy-saving housing 1. Reference number 3B denotes the wall part of the first floor of the energy-saving housing 1. Reference number 4A denotes the floor part of the second floor of the energy-saving housing 1. Reference number 4B denotes the floor part of the first floor of the energy-saving housing 1 and 5A denotes the ceiling part of the second floor of the energy-saving housing 1. Reference number 5B denotes the ceiling part of the first floor of the energy-saving housing 1 and 6 denotes the window parts (openings) with a heat transmission coefficient of 1.4 W/m$^2$K through 2.5 W/m$^2$K formed at predetermined portions of the wall parts 3A and 3B. Reference number 7 denotes a wellhole part, which opens with an opening proportion of 15% through 50% or 20% through 50% of the floor area of the first floor and communicates the first floor and second floor with each other. Reference number 8 denotes a housing ventilation part provided at the top part of the roof part 2. In this embodiment, the opening proportion of the wellhole part 7 does not include the opening proportion of the stairs. Only the window parts 6 are shown as openings, however, the door parts (not shown) of the entrance, kitchen, and the like are also regarded as openings, and are formed so as to have the same heat transmission coefficient of 1.4 W/m$^2$K through 2.5 W/m$^2$K as that of the window parts 6.

Herein, the energy-saving housing 1 in this embodiment is formed so as to have an equivalent clearance area of 0.3 cm$^2$/m$^2$ through 0.6 cm$^2$/m$^2$.

In FIG. 2, reference number 9 denotes the outer roof part of the asbestos straight covered roof part 2. Reference number 10$a$ denotes a structural board for the roof part 2 composed of structural plywood disposed at the lower surface (the ceiling part 5A side) of the outer roof part 9. Reference number 10$b$ denotes a structural board for the roof part 2 composed of structural plywood that is disposed below the structural board 10$a$ via a ventilation layer 11 of the roof part 2 formed at the lower part of the structural board 10$a$ and 12$a$ denotes a heat insulator for the roof part 2 made from soft foamed urethane of an organic foamed material sprayed on the lower surface of the structural board lob. Reference number 12$b$ denotes a heat insulator made from soft foamed urethane of an organic foamed material sprayed on the wall part 3A side between the roof part 2 and the ceiling part 5A of the second floor and 13 denotes an eave edge intake louver formed so as to be communicated with the ventilation layer 11 at the edge of the eaves of the roof part 2. Reference number 14 denotes a gutter provided below the eave edge intake louver 13 at the edge of the eaves of the roof Reference number 15 denotes outer walling for the wall parts 3A and 3B. Reference number 16 denotes ventilation layers of the wall parts 3A and 3B formed at the inner side from the outer walling 15, reference number 16a denotes an eave soffit edge portion formed so as to be communicated with the ventilation layer 16 at the upper end part of the ventilation layer 16 below the roof part 2. Reference number 17 denotes windbreak moisture permeative sheets for wall parts 3A and 3B, which are disposed at the inner sides from the outer walling 15 via the ventilation layers 16 and formed of synthetic resin sheets or films and 18 denotes structural boards for the wall parts 3A and 3B, which are provided at the inner side from the windbreak moisture permeative sheet 17 and formed of structural plywood. Reference number 19 denotes heat insulators for the wall parts 3A and 3B, which are made from soft foamed urethane of an organic foamed material sprayed on the back surfaces of the structural boards 18. Reference number 20a denotes inner walling for the wall part 3A made from an inorganic material such as a double plaster board provided at the inner side of the heat insulator 19. Reference number 21a denotes inner walling made from an inorganic material such as a plaster board provided at the inner side of the ceiling part 5A of the second floor.

In FIG. 3, reference number 20b denotes inner walling for the wall part 3B made from an inorganic material such as a plaster board provided at the inner side of the heat insulator 19 of the wall part 3B. Reference number 21b denotes the inner walling which is doubly provided and made from an inorganic material such as a plaster board provided at the inner side of the ceiling part 5B of the first floor. Reference number 22 denotes a heat insulator made from soft foamed urethane of an organic foamed material sprayed on the wall part 3B side (heat insulator 19) between the floor part 4A of the second floor and the ceiling part 5B of the first floor. Reference number 23 denotes a wooden floor of the floor part 4A of the second floor. Reference number 24 denotes a structural board formed of structural plywood provided at the lower surface (first floor side) of the wooden floor 23. Reference number 25 denotes a sound insulation board provided on the lower surface of the structural board 24. Reference number 26 denotes a structural board formed of structural plywood provided on the lower surface of the sound insulation board 25. Reference number 27a denotes an airtight packing made from rubber or a high density foamed resin of independent foams, which is provided on the lower surface of the structural board 24 of the floor part 4A at the side of the wall parts 3A and 3B. Reference number 27b denotes a structural member (frame) provided on the lower surface of the airtight packing 27a.

In FIG. 4, reference number 28 denotes the foundation of the energy-saving housing 1. Reference number 29 denotes a dampproofing sheet provided on the upper end face of the foundation 28. Reference number 30a denotes an airtight packing provided between structure members (groundsels) 30b between the dampproofing sheet 29 and the lower end part of the heat insulator 19 of the wall part 3B. Reference number 31 denotes a draining part formed at the lower end part of the ventilation layer 16 at the upper side of the foundation 28 so as to be communicated with the ventilation layer 16. Reference number 32 denotes a floor heating device formed at the lower side of the floor part 4B. Reference number 33 denotes a filling layer for the floor heating device 32 formed by filling gravel and decomposed granite soil on the ground. Reference number 34 denotes a heat insulator for the floor heating device 32 formed of a plate-shaped foamed member provided by a predetermined length above the filling layer 33. Reference number 35 denotes an upper filling layer for the floor heating device 32 filled above the heat insulator 34. Reference number 36 denotes a dampproofing sheet for the floor heating device 32 spread on the upper surface of the upper filling layer 35. Reference number 37 denotes a floor mold concrete layer for the floor heating device 32 provided on the dampproofing sheet 36. 38 denotes a dampproofing sheet for the floor heating device 32 spread on the upper surface of the floor mold concrete layer 37. Reference number 39 denotes a heat insulator for the floor heating device 32 formed of a plate-shaped foamed member provided on the dampproofing sheet 38. Reference number 40 denotes a heat insulator provided between the heat insulators 34 and 39 along the foundation 28. Reference number 41 denotes a heat accumulating layer for the floor heating device 32 formed from mortar or concrete formed on the heat insulator 39. Reference number 42 denotes a reinforcing mesh which is formed into a grid shape having equal pitches of 100 mm through 150 mm and buried in the heat accumulating layer 41. Reference number 43 denotes hot water pipes formed of polybutene pipes with a diameter of 16 mm, which are piped above the reinforcing mesh 42 based on the grid of the reinforcing mesh 42 and buried in the heat accumulating layer 41. Reference number 44 denotes plywood provided at the end of the wall part 3B side of the heat accumulating layer 41. Reference number 45 denotes a felt shrinkage absorber formed from fibers of palms provided between the plywood 44 and structure member 30b. Reference number 46 denotes a floor substrate plywood for the floor part 4B provided on the upper surface of the heat accumulating layer 41 of the floor heating device 32. Reference number 47 denotes flooring for the floor part 4B provided on the upper surface of the floor substrate plywood 46.

In a case where the construction ground of the energy-saving housing 1 is soft, a concrete layer is formed under the filling layer 33 to reinforce the ground and foundation.

Herein, in this embodiment, a paired strengthened glass with a metal film coat (LOW-E) and an argon gas sealed-in is used for the window part 6, and the heat transmission coefficient of the window part 6 is set to 2.5 W/m$^2$K or 1.7 W/m$^2$K.

In this embodiment, as the heat insulators 12a, 12b, 19, and 22 made from soft foamed urethane of an organic foamed material for the roof part 2 and wall parts 3A and 33, the ICYNENE FOAM (product name, made by ICYNENE INC.) is used, and the heat transmission coefficient of the roof part 2 is set to 0.15 W/m$^2$K and the heat transmission coefficient of the wall parts 3A and 3B is set to 0.35 W/m$^2$K. In addition, in place of the ICYNENE FOAM, a polyethylene foam, crosslinked polyethylene, polypropylene foam, polyurethanefoam, and urea resin foam such as SELECTION 500 (commercial name)may be used. Thereby, by only spraying the ICYNENE FOAM by a predetermined thickness on the structural boards 10b and 18 and others, heat insulators with airtightness can be easily formed at necessary portions at the construction site construction work efficiency can be improved and the roof part 2 and wall parts 3A and 3B with high heat insulation are realized.

Furthermore, in this embodiment, as inner walling 20a, 20b, 21a, and 21b made from an inorganic material for the wall parts 3A and 3B and ceiling parts 5A and 5B, noncombustible materials having a low heat conductivity and heat accumulation such as plaster boards and concrete boards are used. Thereby, far infrared rays obtained from the floor heating device 32 can be radiated by the wall parts 3A and 3B and ceiling parts 5A and 5B, and by the radiant heat, the inside of the energy-saving housing 1 can be heated and heat can be accumulated at the ceiling parts 3A and 3B and ceiling parts 5A and 5B to improve heat retention inside the housings Furthermore, since the inner walling 20a, 20b, 21a, and 21b have a number of micro aperture parts at the surface, in accordance with a difference in humidity between the outside air and indoor air, vapor in the indoor air can be condensed and the condensed vapor can be discharged into the indoor air as vapor, whereby automatic humidity adjustments can be made, and safety against fires can be obtained.

Furthermore, in the energy-saving housing 1, on the indoor side surfaces of the inner walling 20a, 20b, 21a and 21b, a wallpaper of clothed fibers, for example, Lafit Cloth (commercial name) made from viscose fibers by Asahi Kasei or wood slabs of paulownia, sun tree, pine, cedar, and others are adhered.

On the upper surface of the structural board 10a, a waterproofing sheet is spread, and then tile and other materials are placed thereon.

Next, the piping of the hot water pipes 43 of the floor heating device 32 installed at the floor part 4B is explained hereinafter with reference to the drawings.

Figure 5:
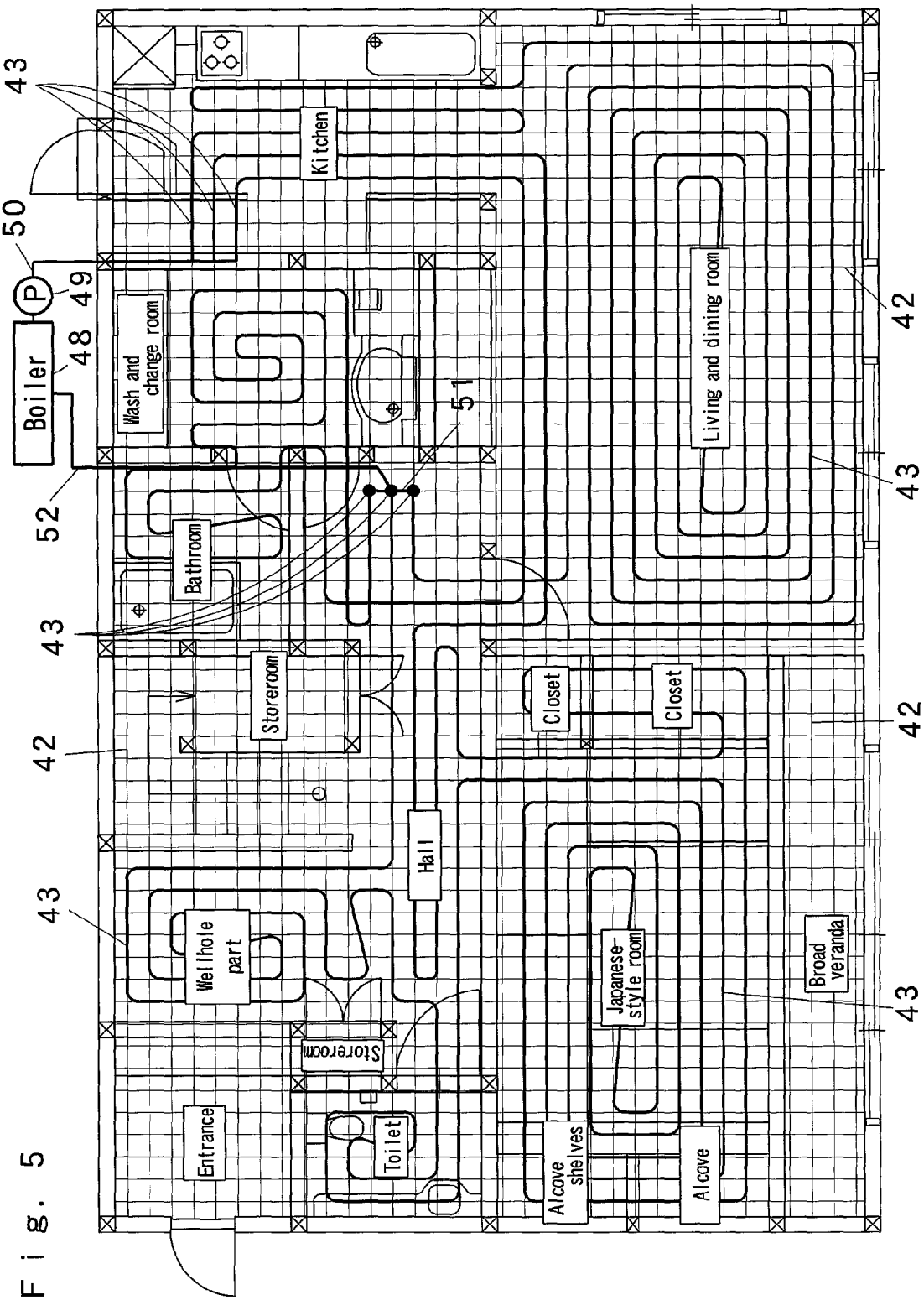
FIG. 5 is a first floor plan view showing the piping of hot water pipes for a floor heating device of the energy-saving housing of the embodiment.

FIG. 5 is a first floor plan view showing the piping of the hot water pipes of the floor heating device of the energy-saving housing in this embodiment.

In the figure, reference number 48 denotes a boiler for the floor heating device 32 installed outdoors. Reference number 49 denotes a pump for supplying hot water to the hot water pipes 43. Reference number 50 denotes a supply pipe which is connected to boiler 48 via pump 49 and supplies hot water to the respective hot water pipes 43 in each direction. Reference number 51 denotes a collecting pipe (header) to which the respective hot water pipes 43 are connected. Reference number 52 denotes a returning pipe which is connected to the collecting pipe 51 and boiler 48, and returns hot water that has circulated in the respective hot water pipes 43 to the boiler 48.

The number of hot water pipes 43 to be provided is one or a multiple depending on the first floor area and arrangement, and both ends of each hot water pipe 43 are connected to the supply pipe 50 and collecting pipe 51. When only one hot water pipe 43 is used, the collecting pipe 51 is not necessary, and the hot water pipe 43 is directly connected to the returning pipe 52.

Herein, in this embodiment, as shown in FIG. 5, the hot water pipes 43 are also provided at a wash area of a bathroom, a toilet, and closets. Thereby, differences in temperature between the bathroom, toilet, and closets and the respective rooms can be eliminated, whereby condensation and propagation of mold in the bathroom, toilet, and closets can be prevented.

When the floor heating device 32 is installed at the lower portion of the floor part 4B, as shown in FIG. 4, the filling layer 33 is formed by filling gravel and decomposed granite soil on the ground, and then, heat insulators 34 and 40 formed of plate-shaped foamed members are installed along the upper side of the filling layer 33 and the side of the foundation 28. Then, the upper filling layer 35 is formed above the heat insulator 34, and after smoothing the upper surface of the layer while pressing it, the dampproofing sheet 36 is spread on the upper surface of the upper filling layer 35. Then, the floor mold concrete layer 37 is provided on the dampproofing sheet 36 and dried, and thereafter, the dampproofing sheet 38 is spread on the upper surface of the floor mold concrete layer 37. Then, the heat insulator 39 formed of a plate-shaped foamed member is provided above the dampproofing sheet 38.

Then, shrinkage absorber 45 and plywood 44 are placed on the heat insulator 39 along the structure member 30b, the heat accumulating layer 41 made from mortar or concrete is formed by a predetermined thickness on the heat insulator 39, and then the reinforcing mesh 42 formed into an equal-spaced grid is laid above the heat accumulating layer 41. Next, as shown in FIG. 5, the hot water pipes 43 are piped into a swirl pattern based on the grid of the reinforcing mesh 42 from the position of the wall part side on which the outside air greatly influences, and the hot water pipes 43 are tied and fixed to the reinforcing mesh 42. Herein, the hot water pipes 43 are piped, as shown in FIG. 5, for the entire first floor excluding sections for which objects are placed on and floor heating is not necessary such as the sink in the kitchen and the location of the bathtub.

Thereafter, the heat accumulating layer 41 made from mortar or concrete is formed by a predetermined thickness above the reinforcing mesh 42 and hot water pipes 43, whereby a floor heating device 32 is formed.

Next, the heating effect in the energy-saving housing 1 by the floor heating device 32 is explained below.

When the floor heating device 32 operates, hot water circulates in the hot water pipes 43, the heat accumulating layer 41 is heated by the heat of hot water flowing in the hot water pipes 43, whereby heat is accumulated in the heat accumulating layer 41 and the floor part 4B is warmed. When the floor part 4B is warmed, far infrared rays are generated from the floor part 4B and act on the molecular motion of crystal water or the like of the inner walling 20b and 21b made from an inorganic material at the wall part 3B and the ceiling part 5B of the first floor. As a result, heat is accumulated in the inner walling 20b and 21b and heat is radiated from the inner walling 20b and 21b, whereby the entirety of the inside of the first floor of the energy-saving housing 1 is heated by the radiant heat.

Furthermore, since the energy-saving housing 1 comprises the wellhole part 7 opening at an opening proportion of 15% through 50% or 20% through 50% of the first floor area, the radiant heat of the first floor is transmitted to the second floor through the wellhole part 7, and far infrared rays generated from the floor part 4B at the lower side of the wellhole part 7 strike the inner walling 21a made from an inorganic material at the second floor ceiling part 5 through the wellhole part 7, whereby heat is accumulated in the inner walling 21a and radiated. The radiant heat strikes the inner walling 20a made from an inorganic material at the second floor wall part 3A, and furthermore, heat is also accumulated in the inner walling 20a and radiated, whereby the inside of the whole second floor of the energy-saving housing 1 is also heated by the radiant heat.

Herein, the inner walling 21a made from an inorganic material at the second floor ceiling part 5A may be provided at only a portion of the ceiling part 5A facing the wellhole part 7 (ceiling part 5A at the upper side of the wellhole part 7). If the inner walling 21a made from an inorganic material is provided at least at the portion facing the wellhole part 7, radiant heat of far infrared rays generated from the floor part 4B can be received, accumulated, and radiated by the inner walling 21a at the ceiling part 5A, whereby the second floor can be also heated by the radiant heat.

As partitioning walls for the second floor, inner walls made from an inorganic material as the wall parts 3A and 3B are preferably used. Thereby, the radiant heat from the floor heating device 32 of the first floor can be accumulated in the partitioning walls and the radiant heat can be obtained from the partitioning walls, and this improves heating efficiency and heating performance of the second floor.

Next, a programmed ventilator of the energy-saving housing 1 in this embodiment is explained below with reference to the drawings.

Figure 6:
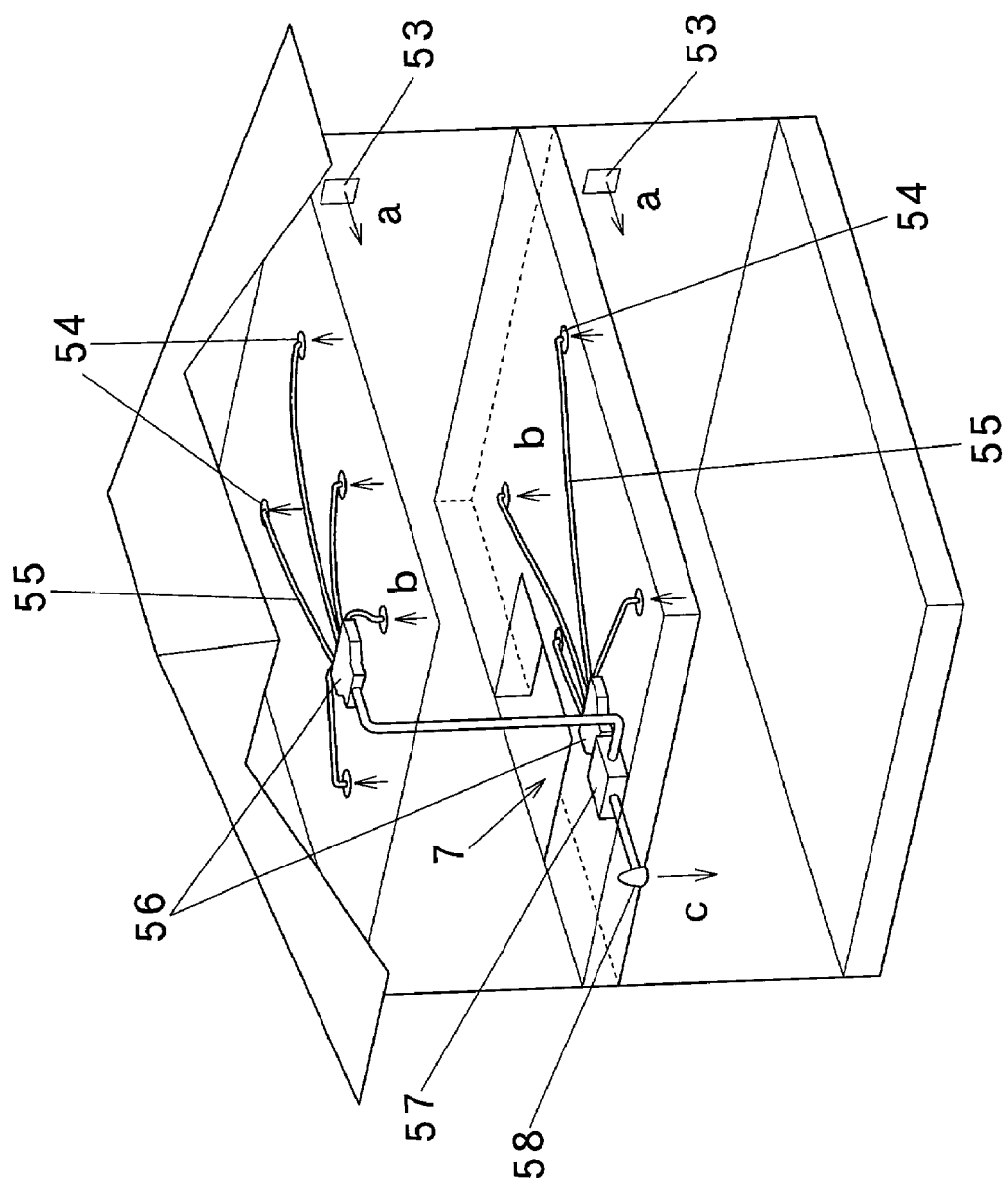
FIG. 6 is a principal partially sectional perspective view showing a programmed ventilator of the energy-saving housing of the embodiment.

FIG. 6 is a principal part section perspective view showing the programmed ventilator of the energy-saving housing of the embodiment.

In the figure, reference number 53 denotes air inlets of the programmed ventilator formed in predetermined wall surfaces of each floor of the energy-saving housing 1 so as to be communicated with the outdoor air. Reference number 54 denotes suction ports of the programmed ventilator formed at predetermined positions of the ceiling parts 5A and 5B inside the respective first and second floors of the energy-saving housing 1. Reference number 55 denotes ventilation ducts of the programmed ventilator provided in the attic of each floor and communicated with the respective suction ports 54. Reference number 56 denotes branching portions of the programmed ventilator which are provided on the attic of each floor and to which the respective ventilation ducts 55 are connected. Reference number 57 denotes a ventilation fan of the programmed ventilator provided on the attic of the first floor and connected to the respective branching portions 56 via the ventilation ducts 55. Reference number 58 denotes an air outlet of the programmed ventilator which is connected to the ventilation fan 57 via the ventilation ducts 55 and formed at a predetermined position in the outer wall of the energy-saving housing 1.

Furthermore, the arrows a in the figure show outdoor air intake via the air inlets 53, the arrows b show air suction of the inside of each floor via each suction port 54, and the arrow c shows exhaustion of the inside air of each room suctioned via each suction port 54 to the outside via the air outlet 58.

In place of the ventilation fan 57, a heat exchanging ventilation device with a heat exchanger may be used, and air cleaning filters may be provided at the air inlets 53.

In the case where a heat exchanging ventilation device is used, the indoor temperature can be prevented from changing by indoor ventilation, whereby the indoor temperature can be maintained to be always fixed and the indoor environment can be made comfortable. In the case where air cleaning filters are provided at the air inlets 53, entrance of pollen, insects, viruses, dust, and bad odors such as exhaust gases within the outdoor air can be prevented, and indoor odors due to cooking, smoking and the like and moisture in the bathroom and moisture generated by human breathing can be eliminated, and this improves sanitation of the indoor environment.

Next, the action of the programmed ventilation inside the energy-saving housing 1 using the programmed ventilator in the embodiment is explained below.

When the ventilation fan 57 is driven, the indoor air is suctioned via each suction port 54, and at the same time, outdoor air is taken-in via the air inlets 53. Thereby, the indoor air is exchanged with the outdoor air to ventilate the indoor air. The indoor air suctioned via the suction ports 54 are exhausted to the outside via the air outlet 58 through the ventilation ducts 55, branching portions 56, and ventilation fan 57.

Next, ventilation of the wall parts 3A and 3B and roof part 2 of the energy-saving housing 1 in the embodiment is explained below with reference to the drawing.

Figure 7:
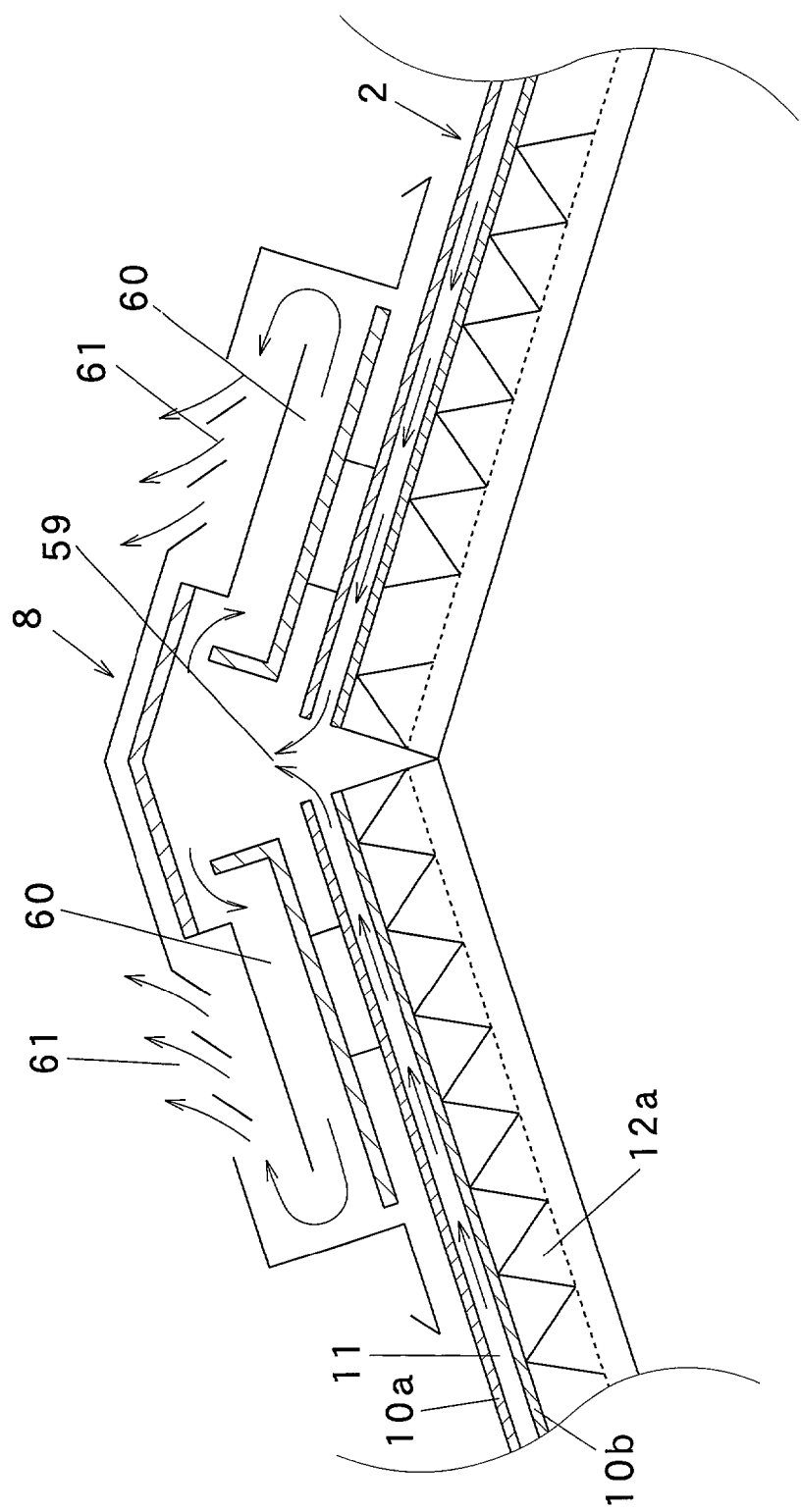
FIG. 7 is a partially sectional view showing a housing ventilation part of the energy-saving housing of the embodiment.

FIG. 7 is a principal part section showing the housing ventilation portion of the energy-saving housing in the embodiment.

In the figure, reference number 59 denotes a ventilation communicating portion which opens at the top part of the roof part 2 and communicates the ventilation layer 11 and housing ventilation portion 8, reference number 60 denotes ventilation passages of the housing ventilation portion 8 communicated with the ventilation communicating portion 59, and reference number 61 denotes an exhaust opening communicated with the ventilation passages 60 and formed to open at the upper surface of the housing ventilation portion 8. The arrows in the figure show the flows of the outdoor air entering through the ventilation layer 11.

At the roof part 2 of the energy-saving housing 1, the outdoor air flows into the ventilation layer 11 from the eave edge intake louver 13 (see FIG. 2) which is formed between the structural boards 10a and 10b and communicated with the ventilation layer 11. The outdoor air flowing into the ventilation layer 11 flows into the housing ventilation portion 8 from the ventilation communicating portion 59 through the ventilation layer 11 as shown by the arrows in FIG. 7, and then passes through the ventilation passage 60 of the housing ventilation portion 8 and is exhausted to the outside from the exhaust opening 61.

At the wall parts 3A and 3B of the energy-saving housing 1, outdoor air flows into the ventilation layer 16 from the draining part 31 (see FIG. 4) communicated with the lower end part of the ventilation layer 16. The outdoor air flowing-into the ventilation layer 16 passes through the ventilation layer 16 and is exhausted to the outside from the eave soffit edge portion 16a (see FIG. 2) formed and communicated with the upper end part of the ventilation layer 16.

In the energy-saving housing 1 of the embodiment, the case where the heat insulator 12a of an organic foamed material made from soft foamed urethane is sprayed on the lower surface of structural plywood 10b of the roof part 2 is explained. However, in place of forming the heat insulator 12a at the roof part 2, structural plywood may be provided at the upper surfaces (attic side) of the inner walling 21a of the ceiling parts 5A and 5B, made from an inorganic material, and an organic foamed material made from soft foamed urethane may be sprayed on the structural plywood to form heat insulation layers at the ceiling parts 5A and 5B.

The energy-saving housing of the embodiment is constructed as mentioned above, and has the following actions.

(1) Since the floor heating device is provided at the floor part of the first floor, and the wall part and ceiling part are provided with inner walling made from an inorganic material, far infrared rays generated from the floor part by the floor heating device strike the inner walling, whereby heat can be accumulated in the inner walling and radiated by the inner walling, and as a result, both the heating effect directly obtained from the floor by the floor heating device and the heating effect by means of radiant heat from the inner walling at the wall part and ceiling part are obtained. Therefore, different from the conventional example, without relying on only the direct heating effect from the floor heating device, the radiant heat is also utilized to heat the entirety of the inside, and accordingly, the whole of the housing can be efficiently heated by a small amount of energy while suppressing loads on heating devices.

(2) A noncombustible member having a low heat conductivity and having heat accumulating performance such as a plaster board or concrete board is used for the inner walling, so that the inside of the energy-saving housing can be heated by radiant heat obtained by radiating far infrared rays from the wall parts and ceiling parts by the floor heating device, and heat can be accumulated at the wall parts and ceiling parts. This improves the indoor heat retentions and improves safety against fires. Furthermore, at the first floor ceiling part and second floor wall part at which the inner walling is doubly provided, the heat accumulating performance of the inner walling is improved, and sound insulation performance is also improved.

(3) The heat insulators are formed of organic foamed materials made from soft foamed urethane sprayed on the structural boards for the wall parts and roof part, so that the heat insulation of the wall parts and roof part is excellent, and the indoor temperature can be greatly prevented from changing due to influences from the outdoor temperature, whereby a comfortable indoor temperature condition can be maintained.

(4) Since the heat insulators at the wall parts and roof part are formed from soft foamed urethane sprayed on the structural boards, heat insulation layers with airtightness can be easily formed at necessary portions by spraying soft foamed urethane at the housing construction site, and this improves construction work efficiency for the wall parts and roof part.

(5) Since soft foamed urethane (ICYNENE FOAM) is used for the heat insulators and heat insulation layers are formed by spraying it, the soft foamed urethane can be closely adhered in any space, high heat insulation performance can be realized, and the soft foamed urethane can be prevented from deteriorating such as separating from structural boards due to changes with the elapse of time, whereby a high heat insulating effect can be maintained for a long period of time and excellent durability is obtained.

(6) Since the heat insulators are made from soft foamed urethane, the heat insulators are excellent in elasticity, and can adapt to shrinkage due to shocks of earthquakes and dryness of the structural members, and the heat insulators can be prevented from cracking, separating from the structural members and boards, and being damaged, whereby the heat insulators are excellent in durability, and since their high heat insulation and airtight performance can be maintained for a long period of time, excellent durability in heat insulation and airtightness can be obtained.

(7) Since soft foamed urethane is used for the heat insulators and the heat transmission coefficient of the roof part and wall parts is set to 0.15 W/m$^2$K through 0.35 W/m$^2$K, the heat loss amount from the roof part and wall parts can be suppressed, indoor airtightness and indoor heat insulation performance can be improved. As a result, leakage of cooled or heated air inside the housing from the root part and wall parts can be greatly prevented, whereby energy for cooling devices and the floor heating device can be saved.

(8) The energy-saving housing is constructed so that the equivalent clearance area becomes 0.3 cm$^2$/m$^2$ through 0.6 cm$^2$/m$^2$, the heat transmission coefficient at the wall parts and roof part with heat insulators becomes 0.15 W/m$^2$K through 0.35 W/m$^2$K, and the heat transmission coefficient at the window part becomes 1.4 W/m$^2$K through 2.5 W/m$^2$K. Therefore, the energy-saving housing is excellent in airtightness and heat insulation performance, and the heat loss coefficient of the energy-saving housing can be suppressed to 1.4 W/m$^2$K or less. As a result, indoor cooling and heating effects can be increased, and energy for cooling devices and the floor heating device can be saved.

(9) Since a floor heating device is provided at the floor part of the first floor and a wellhole part with an opening proportion of 15% through 50% or 20% through 50% of the first floor area is provided, by only heating the first floor with the floor heating device, radiant heat can be obtained by striking far infrared rays generated from the floor part of the first floor by the floor heating device on the inner walling that is made from an inorganic material at the ceiling and wall faces of the second floor through the wellhole part, and the radiant heat heating the first floor can be transmitted to the second floor through the wellhole part, whereby the second floor can be also heated by the radiant heat from the floor heating device at the first floor. Therefore, different from the conventional example, it is not required to provide various heating devices for each room, and the inside of the housing can be heated by only the floor heating device of the first floor, whereby energy for heating can be saved.

(10) A reinforcing mesh shaped into an equal-spaced grid is provided for the heat accumulating layer of the floor heating device, and hot water pipes are piped above the reinforcing mesh. Therefore, by only laying the hot water pipes based on the grid of the reinforcing mesh and tying and fixing the pipes to the reinforcing mesh when constructing the floor heating device, hot water pipes can be easily piped at only necessary locations, whereby conventional works such as marking for determining piping positions of the hot water pipes become unnecessary. This improves piping work efficiency for the hot water pipes.

(11) Since the hot water pipes are piped above the reinforcing mesh, after piping the hot water pipes, walking on the reinforcing mesh is possible while avoiding the laid hot water pipes, and therefore, construction work efficiency for the floor heating device can be improved.

(12) Since a felt shrinkage absorber made from palm fibers is provided at the outer periphery of the heat accumulating layer of the floor heating device, shrinkage of the heat accumulating layer and structural members due to changes in temperature of the heat accumulating layer can be absorbed by the shrinkage absorber, and this prevents the foundation section of the energy-saving housing from deforming.

(13) Since the hot water pipes for the floor heating device are arranged in a swirl pattern from a wall part side position which the outdoor air greatly influences, hot water with a high temperature supplied from the boiler can be supplied to the wall part side near the outdoor air. As a result, almost the whole face of the floor part can be evenly heated by the floor heating device, and this improves the heating performances.

(14) Since a programmed ventilator for forcibly ventilating the indoor air is provided, even inside a room with high airtightness whose equivalent clearance area is 0.3 cm$^2$/m$^2$ through 0.6 cm$^2$/m$^2$, air inside the room can be ventilated and exchanged with the outdoor air and the indoor environment including the indoor humidity or the like can be maintained to be comfortable. Particularly, by ventilation suitable for the housing such as 24-hour ventilation and regulated ventilation in the morning and evening, the indoor humidity can be maintained to be in an optimum humidity range of 40% through 60% throughout the year, and this prevents propagation of mold and ticks and indoor condensation and realizes comfortable living and working spaces.

(15) Since the roof part is provided with a ventilation layer and an eave edge intake louver, and a housing ventilation portion communicated with the ventilation layer is provided, by causing the outdoor air to flow in the ventilation layer from the eave edge intake louver and exhausting the air from the housing ventilation portion, air can be always caused to flow inside the roof part. As a result, condensation in the attic space can be prevented, durability of the structural boards and heat insulators for the roof part can be improved, and a lowering in the performance of the heat insulators can be prevented. Particularly, the temperature can be prevented from increasing in the attic space during the summer season, and loads on cooling devices can be suppressed while the cooling effect by the cooling devices is increased, whereby energy for cooling devices can be saved.

(16) Since wall parts are provided with a ventilation layer, and a draining portion communicated with the lower end part of the ventilation layer and an eave soffit edge portion communicated with the upper end part of the ventilation layer are provided, the outdoor air can be caused to flow into the ventilation layer from the draining portion and exhausted from the eave soffit edge portion, whereby air can be made to always flow inside the wall parts. This prevents condensation and propagation of molds inside the wall parts, improves the durability of the structural boards and heat insulators at the wall parts, and prevents a lowering in performance of the heat insulators.

(17) In summer season, by making water to flow into the hot water pipes of the floor heating device, feet can be cooled and the cooling effect can be increased.

(Experimental Example)

The indoor temperature and humidity in summer and winter in the energy-saving housing of the invention constructed in the same manner as the energy-saving housing 1 of this embodiment and the outdoor temperature and humidity on the same days were measured for one week.

Figure 8:
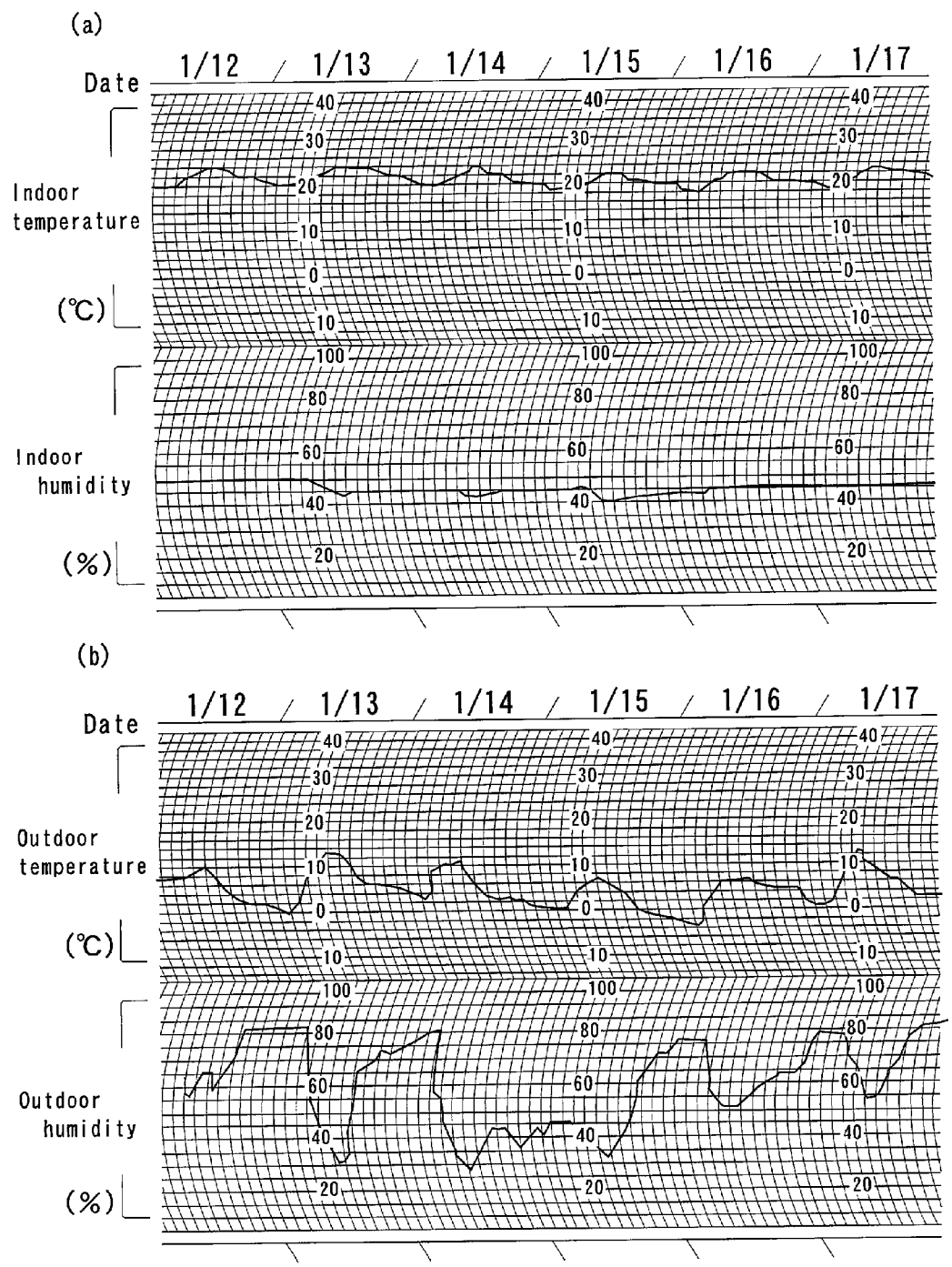
FIG. 8($a$) is a chart of changes in the indoor temperature and humidity of the energy-saving housing 1 in winter.

FIG. 8(*a*) is a chart of changes in the indoor temperature and humidity in winter in the energy-saving housing 1, FIG. 8(*b*) is a chart of changes in the outdoor temperature and humidity in winter, FIG. 9(*a*) is a chart of changes in the indoor temperature and humidity in summer in the energy-saving housing 1, and FIG. 9(*b*) is a chart of changes in the outdoor temperature and humidity in summer.

The axes of abscissas of FIG. 8 and FIG. 9 show the dates of measurements, the axes of ordinates at the upper sides show the indoor temperatures (° C.), and the axes of ordinates at the lower sides show the indoor humidity (%).

From FIG. 8, it can be understood that the indoor temperature is maintained at approximately 20° C. even when the outside temperature is 0° C. in winter. Furthermore, it can also be understood that the indoor humidity is constantly maintained at approximately 40% within the optimum humidity range although the outside humidity greatly changes.

Furthermore, from FIG. 9, it can be understood that the indoor temperature is maintained at approximately 25° C. even when the outdoor temperature exceeds 30° C. in summer. It can also be understood that the indoor humidity is constantly maintained at approximately 60% within the optimum humidity range although the outdoor humidity greatly changes.

From the abovementioned results, it was proved that the energy-saving housing of the invention is excellent in air-tightness and heat insulation performance, and can maintain comfortable temperature and humidity environments throughout the year without being influenced by outdoor temperatures and humidity, and realize healthy comfortable living and working spaces.

(Demonstration of Experimental Results)

The yearly heating and cooling load of the energy-saving housing of the invention was evaluated at the Builders System Institution by using a heat load calculation program "SMASH" of the Institute for Building Environment And Energy Conservation.

Figure 10:
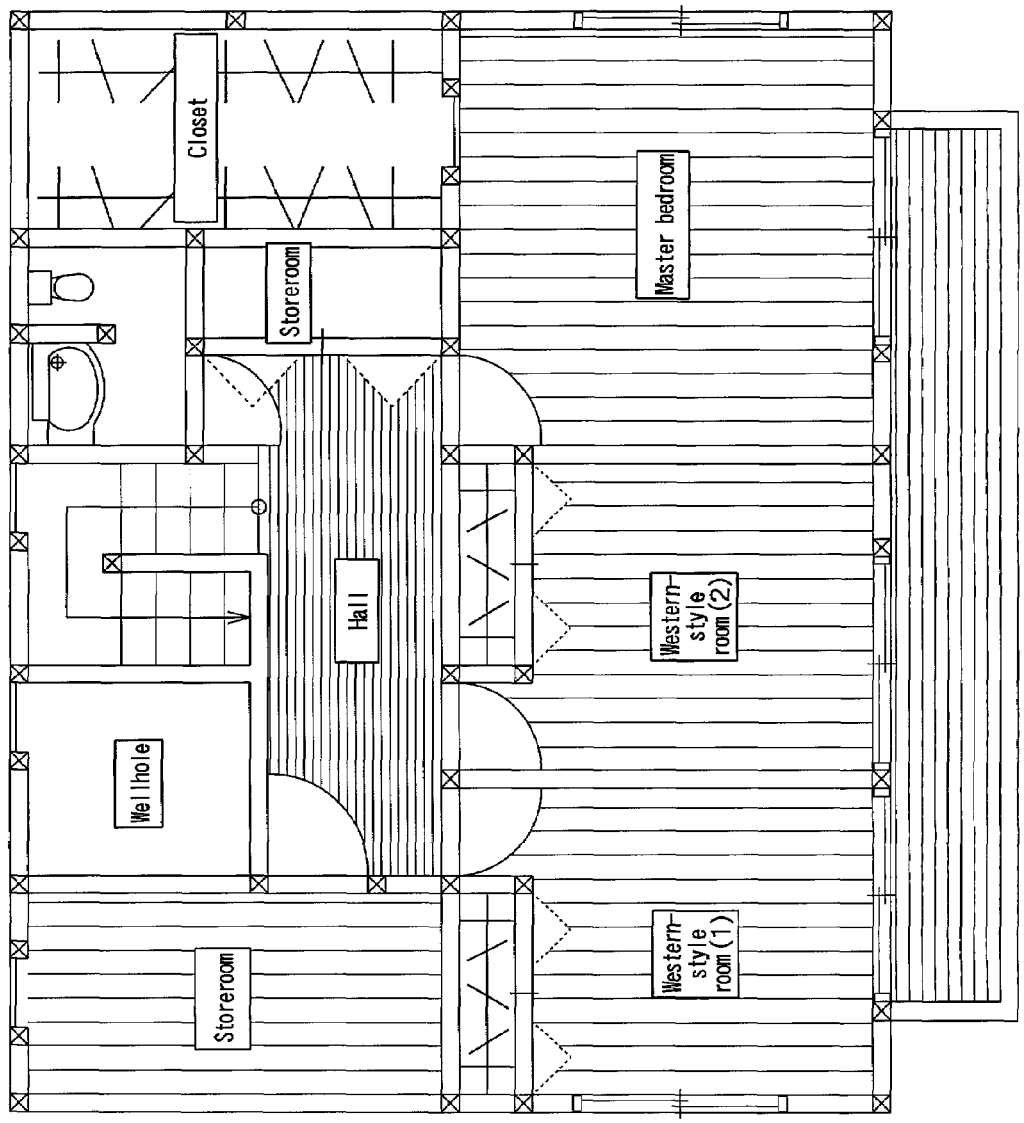
FIG. 10 is a second floor plan view of a model house by means of SMASH calculation.

FIG. 10 is a second floor plan view of a model house by means of the SMASH calculation. The first floor plan view of the model house by means of the SMASH calculation is similar to FIG. 5. Herein, the total floor area of the model house is 149.06 m$^2$, air volume is 401.88 m$^3$, first floor area is 82.81 m$^2$, ceiling area is 149.06 m$^2$, outer wall area is 147.3 m$^2$, the opening area at the window parts is 38.02 m$^2$, opening at the door parts is 4.62 m$^2$, the heat transmission coefficient at the window parts is 2.00 W/m$^2$K, and the heat transmission coefficient at the door parts is 2.11 W/m$^2$K.

Regarding the model house shown by FIG. 5 and FIG. 10, SMASH calculation is carried out for four types, that is, a type (H1) which is constructed by means of a conventional structure and provided with heat insulators made from the ICYNENE FOAM at the wall parts and roof part as in the embodiment, a type (H2) which is constructed by means of a conventional structure and provided with heat insulators made from the ICYNENE FOAM at the wall parts and ceiling part, a type (H3) which is constructed by means of frame construction and provided with heat insulators made from the ICYNENE FOAM at the wall parts and roof part as in the embodiment, and a type (H4) which is constructed by means of frame construction and provided with heat insulators made from the ICYNENE FOAM at the wall parts and ceiling part.

Conditions for SMASH calculation are set as follows.

(1) Weather data to be used shall be FUKUOKA's.

(2) The heating period shall be the whole period with a daily mean air temperature of 15° C. or lower.

(3) The cooling period shall be the whole period other than the heating period.

(4) Continuous heating and cooling are carried out for all rooms.

(5) Heating shall be set to 18° C. or higher, and the humidity shall be natural.

(6) Cooling shall be set to 27° C. or lower, and the relative humidity shall be 60% or lower.

(7) The sensible heat amount and latent heat amount generated indoors are set to be always evenly fixed from the total floor area, wherein the sensible heat amount shall be 691.47 W, and the latent heat amount shall be 173.90 W. The heat quantity generated from humans existing in the house and lighting are assumed to be zero.

(8) when the outside air temperature is 25° C. or lower, ventilation shall be carried out without cooling.

The SMASH calculation was carried out under the above-mentioned conditions. As a result, the yearly heating and cooling load of H1 was 341.87 MJ/m$^2$, the yearly heating and cooling load of the H2 was 318.51 MJ/m$^2$, the yearly heating and cooling load of H3 was 343.54 MJ/m$^2$, and the yearly heating and cooling load of H4 was 320.14 MJ/m$^2$, and an evaluation was made wherein the yearly heating and cooling loads in all cases were within the range of 318 MJ/m$^2$ through 344 MJ/m$^2$ and were lower than the standard value 460 MJ/m$^2$ of FUKUOKA's yearly heating and cooling load as a next generation energy-saving standard, and therefore, the energy-saving housing of the invention has performance superior to the next generation energy-saving standards.

As mentioned above, the energy-saving housing of the invention can realize the following excellent effects.

According to the first aspect of the invention:

(1) Since a floor heating device is provided at the floor part and inner walling made from an inorganic material is provided for the wall parts and ceiling parts, far infrared rays generated from the floor part by the floor heating device can be caused to act on molecular motion in crystal water or the like of the inner walling made from an inorganic material, and as a result, radiant heat can be obtained from the inner walling. Therefore, the inside of the housing can be heated by both the heating effect of heat directly obtained from the floor heating device and the heating effect of radiant heat, whereby the total heating effect is excellent. Therefore, different from the conventional example, without relying on only the direct heating effect of the floor heating device, radiant heat can be utilized to heat the whole inside of the housing, loads on the floor heating device can be greatly suppressed, and the whole inside of the housing can be efficiently heated by a small amount of energy, whereby energy-savings can be realized.

(2) Since inner walling made from an inorganic material is provided, heat can be accumulated at the wall parts and ceiling parts by means of far infrared rays obtained from the floor heating device, indoor heat retention performance is excellent, and loads on the floor heating device can be greatly suppressed, whereby energy-savings can be realized.

(3) Since a porous and inorganic material is used for the inner walling at the wall parts and ceiling parts, in accordance with differences in humidity between the outdoor air and indoor air, vapor in air inside the inner walling can be condensed, and moisture condensed inside the inner walling can be discharged into the inside air as vapor. Thereby, the indoor humidity can be automatically adjusted, and the indoors can be maintained at a stable humidity and a comfortable humidity environment can be realized.

(4) Since the wall parts and the ceiling parts or roof part are provided with heat insulators made from an organic foamed material, heat leakage from the wall parts and the ceiling parts or roof part to the outside can be greatly suppressed, heat insulation performance at the wall parts and the ceiling parts or roof part can be improved, and as a result, changes in the indoor temperature due to influences from the outdoor temperature can be greatly suppressed, and regardless of the outdoor temperatures, the indoors can be maintained at a comfortable temperature without increasing the loads on the floor heating device and cooling devices.

(5) Since the energy-saving housing is constructed so that the equivalent clearance area is 0.1 $cm^2/m^2$ through 0.95 $cm^2/m^2$, preferably, 0.3 $cm^2/m^2$ through 0.6 $cm^2/m^2$, and the wall parts and the ceiling parts or roof part are provided with heat insulators made from an organic foamed material so as to have high heat insulation performance, flowing-in of the outdoor air into the inside and flowing-out of the indoor air can be greatly suppressed. As a result, the heat loss amount of the energy-saving housing can be greatly suppressed, cooling and heating of the inside of the housing can be sufficiently carried out with lower cooling and heating capacities than in the conventional example, and the energy-saving performance for cooling devices and the floor heating device are excellent.

(6) Since a floor heating device is provided at the floor part, and inner walling made from an inorganic material is provided at the wall parts and ceiling parts, indoor heating can be sufficiently carried out by only the floor heating device, and different from the conventional example, without providing various heating devices for each room, an excellent energy-saving performance can be obtained, and changes in temperature between rooms as in the conventional example due to heating of the inside of the housing can be prevented whereby healthy and comfortable living and working spaces can be realized.

According to the second aspect of the invention, in addition to the effects of the first aspect, the following effects are obtained.

(1) Since the heat transmission coefficient of the ceiling part or roof part and the wall part is 0.1 $W/m^2$ through 0.7 $W/m^2$, preferably, 0.15 $W/m^2K$ through 0.35 $W/m^2K$, the heat loss amount from the ceiling part or roof part and the wall part can be suppressed and the indoor airtightness and heat insulation can be increased, and heated indoor air or cooled indoor air can be greatly suppressed from leaking from the ceiling part or roof part and the wall part. As a result, sufficient cooling and heating effects can be obtained by the low cooling and heating capacities of cooling devices and the floor heating device, energy-savings for the cooling devices and the floor heating device can be realized.

According to the third aspect of the invention, in addition to the effects of the first and second aspects, the following effects can be obtained.

(1) Since a programmed ventilator is provided, even in the case where the inside of the housing is made high in airtightness so as to have an equivalent clearance area of 0.1 $cm^2/m^2$ through 0.95 $cm^2/m^2$ or 0.3 $cm^2/m^2$ through 0.6 $cm^2/m^2$, the indoor air can be ventilated by the programmed ventilator as programmed. Therefore, the humidity of the inside of the housing can be maintained within an optimum humidity range of 40% through 60% throughout the year, infestation of ticks, growth of molds, and indoor condensation can be prevented, whereby comfortable healthy living and working spaces can be realized.

(2) Since the whole indoor air can be forcibly ventilated by the programmed ventilator as programmed, the air inside the housing with high airtightness can be always exchanged with fresh air, whereby a comfortable indoor environment can be realized.

According to the fourth aspect of the invention, in addition to the effects of the first through third aspects, the following effects can be obtained.

(1) Since a wellhole part with an opening proportion of 15% through 50%, preferably 20% through 50% of the lower floor area is provided, radiant heat obtained from the floor heating device provided at the floor part of the lower floor can be transmitted to the upper floor through the wellhole part, and radiant heat can be further obtained by striking far infrared rays from the floor heating device on the inner walling at the ceiling part of the upper floor. Therefore, without providing a floor heating device and various heating devices for the upper floor, both the lower and upper floors can be heated by only the floor heating device of the lower floor, whereby energy-savings can be achieved. Also, both formation of a much larger wellhole part and higher heating effects with energy-saving performance than in the conventional example can be achieved at the same time.

(2) Since the opening proportion of the wellhole part is 15% through 50%, preferably 20% through 50% of the floor area of the lower floor, the upper floor can also be sufficiently heated by the floor heating device of the lower floor, and a sufficient floor area can be secured for the upper floor. Therefore, the energy-saving housing has excellent practicability.

According to the fifth aspect of the invention, in addition to the effects of the first through fourth aspects, the following effects are obtained.

(1) Since the heat transmission coefficient of the opening at the window parts and the door part of the entrance is 1.4 W/m²K through 2.5 W/m²K, the heat loss amount of the indoor heat leaking from the openings to the outside and the heat loss amount due to heat of the outdoor air entering the inside from the openings can be suppressed, high airtightness and high heat insulation of the energy-saving housing can be maintained, and loads on the floor heating device and cooling device of the energy-saving housing can be suppressed, whereby indoor air conditioning can be carried out by a small amount of energy.

According to the sixth aspect of the invention, in addition to the effects of the first through fifth aspects, the following effects can be obtained.

(1) Since the heat insulator at the wall parts and the ceiling parts or roof part are made from soft foamed urethane sprayed on the structural boards at the wall parts and the ceiling parts or roof part, the soft foamed urethane can be closely fitted and adhered to any gaps. Therefore, different from glass wool and hard urethane in the conventional example, gaps are not formed between the structural boards and heat insulators, whereby heat insulation performance can be further improved, and deterioration such as separation from the structural boards with the elapse of time as in the conventional case of glass wool and hard urethane can be prevented, excellent durability is obtained, a high heat insulation effect can be maintained for a long period of time, and therefore, high reliability of heat insulation performance can be obtained.

(2) Since the heat insulators are formed by spraying soft foamed urethane on structural boards, heat insulators can be easily formed on necessary locations by only spraying at the housing construction site, whereby housing construction work efficiency can be improved.

(3) Since the heat insulators are made from soft foamed urethane, they have flexibility and can adapt to shrinkage due to earthquakes and dryness of the structural members, whereby, different from the conventional hard urethane, the heat insulators are excellent in durability without cracks and separation from the structural members and boards due to vibrations and expansion and contraction of the structural members.

According to the seventh aspect of the invention, in addition to the effects of the first through sixth aspects, the following effects are obtained.

(1) Since a reinforcing mesh shaped into an equal-spaced grid is provided and laid under the hot water pipes in the heat accumulating layer of the floor heating device, when piping the hot water pipes, the hot water pipes can be piped based on the grid of the reinforcing mesh, and the conventional marking when piping the hot water pipes becomes unnecessary, whereby piping work efficiency for the hot water pipes becomes excellent.

(2) Since the hot water pipes can be piped based on the grid of the reinforcing mesh, the hot water pipes can be easily provided at necessary locations except for locations such as a sink at which floor heating is not necessary, and therefore, construction work efficiency for the floor heating device is excellent.

(3) Since the hot water pipes are piped to tie to the upper side of the reinforcing mesh, after piping the hot water pipes, walking on the reinforcing mesh is possible while avoiding the hot water pipes so as not to step on the laid hot water pipes, whereby construction work efficiency for the floor heating device can be improved.

What is claimed is:

1. Energy-saving housing, comprising:
   a plurality of wall parts including an inner wall made from an inorganic material and a heat insulator made from an organic foamed material;
   a plurality of ceiling parts including an inner wall made from an inorganic material;
   a heat insulator made from an organic foamed material provided at one of said ceiling parts and at a roof part; and
   a floor heating device provided at least at a floor part of a lower floor, wherein an equivalent clearance area thereof is from 0.1 cm²/m² to 0.95 cm²/m²,
   said floor heating device comprises a filling layer; a first dampproofing sheet spread on an upper surface of said filling layer; a floor mold concrete layer provided on said first dampproofing sheet; a second dampproofing sheet spread on an upper surface of said floor mold concrete layer; a heat insulator formed of a plate-shaped foam member provided on said second dampproofing sheet; a reinforcing mesh provided on said heat insulator; and a heat accumulating layer formed from one of mortar and concrete and provided with hot water pipes which are fixed on said reinforcing mesh.

2. The energy-saving housing according to claim 1, wherein the heat transmission coefficient of said ceiling parts or said roof part and said wall parts is from 0.1 W/m²K to 0.7 W/m²K.

3. The energy-saving housing according to claim 1, further comprising a programmed ventilator for forcibly ventilating all indoor air within the housing.

4. The energy-saving housing according to any one of claims 1 through 3, further comprising a wellhole part with a wellhole opening proportion of from 15% to 50% of a floor area of said lower floor.

5. The energy-saving housing according to any one of claims 1 through 3, further comprising a plurality of openings formed in said wall parts with a heat transmission coefficient of from 1.4 W/m²K to 2.5 W/m²K.

6. The energy-saving housing according to any one of claims 1 through 3, wherein said heat insulator of said wall parts and said heat insulator of said ceiling parts or said roof part comprise soft foamed urethane, a polyethylene foam, crosslinked polyethylene foam, polypropylene foam, polyurethane foam and urea resin foam which are sprayed on structural boards at an outer wall side of said wall parts and structural boards of at least one of said ceiling parts and said roof part.

7. The energy-saving housing according to claim 4, further comprising a plurality of openings formed in said wall parts with a heat transmission coefficient of from 1.4 W/m²K to 2.5 W/m²K.

8. The energy-saving housing according to claim 4, wherein said heat insulator of said wall parts and said heat insulator of one of said ceiling parts and said roof part comprise soft foamed urethane, a polyethylene foam, crosslinked polyethylene foam, polypropylene foam, polyurethane foam, and urea resin foam, which are sprayed on structural boards at an outer wall side of said wall parts and structural boards of at least one of said ceiling parts and said roof part.

9. The energy-saving housing according to claim 5, wherein said heat insulator of said wall parts and said heat insulator of one of said ceiling parts and said roof part comprise soft foamed urethane, a polyurethane foam, crosslinked polyethylene foam, polypropylene foam, polyurethane foam, and urea resin foam, which are sprayed on structural boards at an outer wall side of said wall parts and structural boards of at least one of said ceiling parts and said roof part.

10. The energy-saving housing according to claim 7, wherein said heat insulator of said wall parts and said heat insulator of said ceiling parts or said roof part comprise soft foamed urethane, a polyethylene foam, crosslinked polyethylene foam, polypropylene foam, polyurethane foam, and urea resin foam, which are sprayed on structural boards at an outer wall side of said wall parts and structural boards of at least one of said ceiling parts and said roof part.

11. The energy-saving housing according to claim 1, wherein said floor heating device comprises plywood provided at an end of a wall part side of said heat accumulating layer; and a shrinkage absorber provided between said plywood and structure members which comprises a lower part of said wall part.

* * * * *